United States Patent
Domyo et al.

(10) Patent No.: US 8,627,026 B2
(45) Date of Patent: Jan. 7, 2014

(54) STORAGE APPARATUS AND ADDITIONAL DATA WRITING METHOD

(75) Inventors: Seiichi Domyo, Tokyo (JP); Taketoshi Sakuraba, Sagamihara (JP); Hidehisa Arikawa, Isehara (JP)

(73) Assignees: Hitachi, Ltd., Tokyo (JP); Hitachi Computer Peripherals Co., Ltd., Kanagawa-ken (JP)

( * ) Notice: Subject to any disclaimer, the term of this patent is extended or adjusted under 35 U.S.C. 154(b) by 120 days.

(21) Appl. No.: 13/257,677

(22) PCT Filed: Aug. 19, 2011

(86) PCT No.: PCT/JP2011/004637
§ 371 (c)(1),
(2), (4) Date: Sep. 20, 2011

(87) PCT Pub. No.: WO2013/027231
PCT Pub. Date: Feb. 28, 2013

(65) Prior Publication Data
US 2013/0046944 A1 Feb. 21, 2013

(51) Int. Cl.
*G06F 13/00* (2006.01)
*G06F 13/28* (2006.01)

(52) U.S. Cl.
USPC ............ 711/162; 711/E12.103; 707/692

(58) Field of Classification Search
USPC ............... 711/162, E12.103; 707/692
See application file for complete search history.

(56) References Cited

U.S. PATENT DOCUMENTS

| | | |
|---|---|---|
| 6,928,526 B1 * | 8/2005 | Zhu et al. ............ 711/154 |
| 7,155,460 B2 | 12/2006 | McGovern et al. |
| 2007/0083568 A1 | 4/2007 | McGovern et al. |
| 2010/0082672 A1 | 4/2010 | Kottomtharayil et al. |

FOREIGN PATENT DOCUMENTS

JP 4310338 B2 8/2009

OTHER PUBLICATIONS

Andrew S. Tenenbaum, et al., Modern Operating Systems: Design and Implementation, Section 3.4.7 Simulating LRU in Software, Third Edition, Prentice Hall, 2006.
Chuanyi Liu et al, "Semantic Data De-duplication for archival storage systems", Computer Systems Architecture Conference, 2008. ACSAC 2008. 13th Asia-Pacific, IEEE, Piscataway, NJ, USA, Aug. 4, 2008, pp. 1-9.

* cited by examiner

Primary Examiner — Edward Dudek, Jr.
(74) Attorney, Agent, or Firm — Volpe and Koenig, P.C.

(57) ABSTRACT

Deduplicated backup data of a plurality of generations are aggregated and stored.

A storage apparatus is connected via a network to a host system making a content write request and includes a storage unit providing one or more containers composed of a specified storage area, and a back up unit storing the content in the container in accordance with a backup request from the host system; and wherein the backup unit cuts out the content into one or more chunks, detects a duplicate chunk, which is a duplicate of a chunk stored in the container, from the cutout chunks, and additionally writes the chunk, other than the duplicate chunk, to the container where the duplicate chunk is stored.

18 Claims, 17 Drawing Sheets

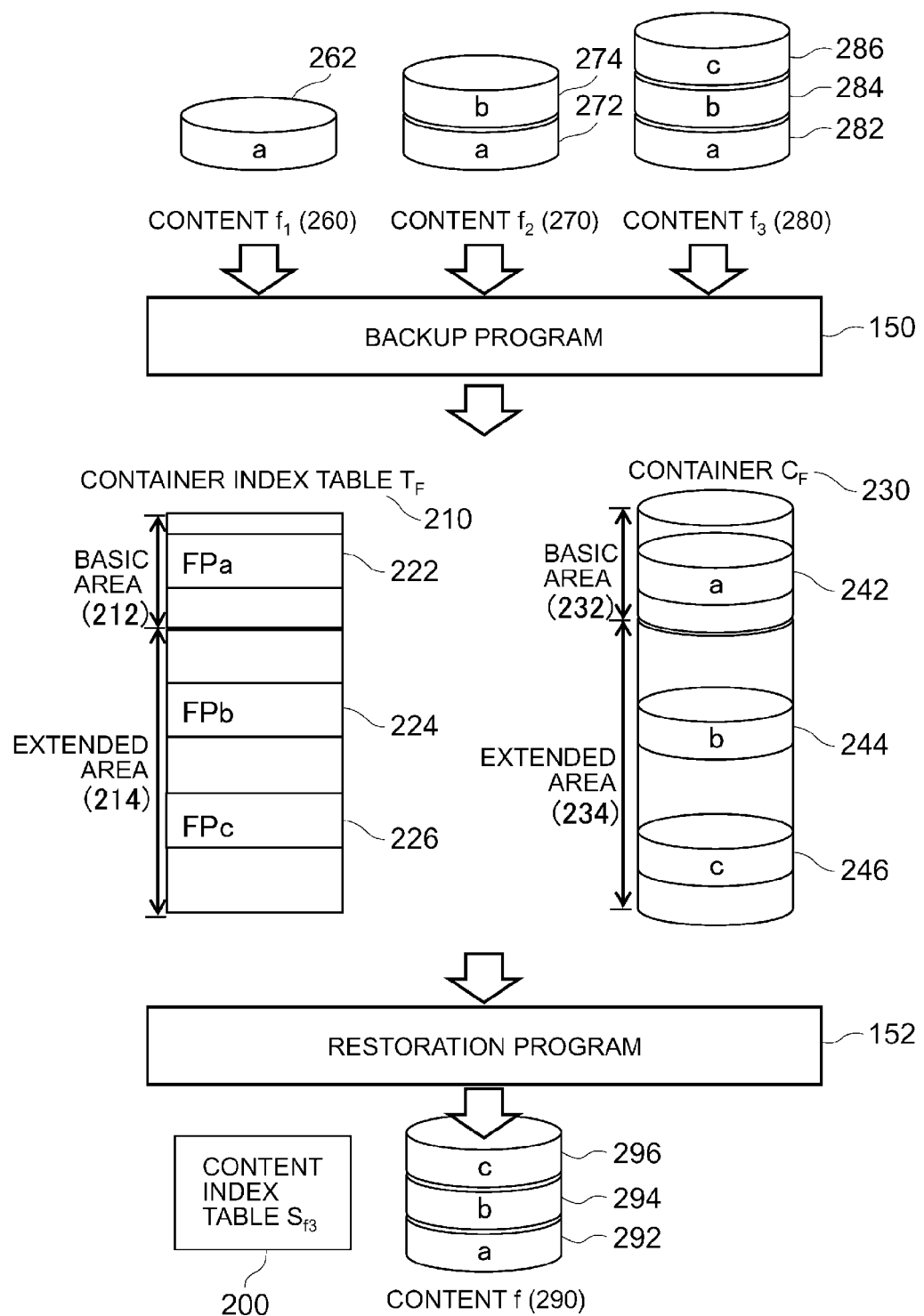

| CONTENT ID | FINGER-PRINT | CONTAINER ID | CONTENT OFFSET | CHUNK LENGTH | |
|---|---|---|---|---|---|
| $f_1$ | $FP_a$ | $C_F$ | offset a | length a | 182 ($S_{f1}$) |
| $f_2$ | $FP_a$ | $C_F$ | offset a | length a | |
| $f_2$ | $FP_b$ | $C_F$ | offset b | length b | 182 ($S_{f2}$) |
| $f_3$ | $FP_a$ | $C_F$ | offset a | length a | |
| $f_3$ | $FP_b$ | $C_F$ | offset b | length b | |
| $f_3$ | $FP_c$ | $C_F$ | offset c | length c | 182 ($S_{f3}$) |
| $f_n$ | CONTENT INDEX TABLE 182 ($S_{fn}$) | | | | |

FIG. 10
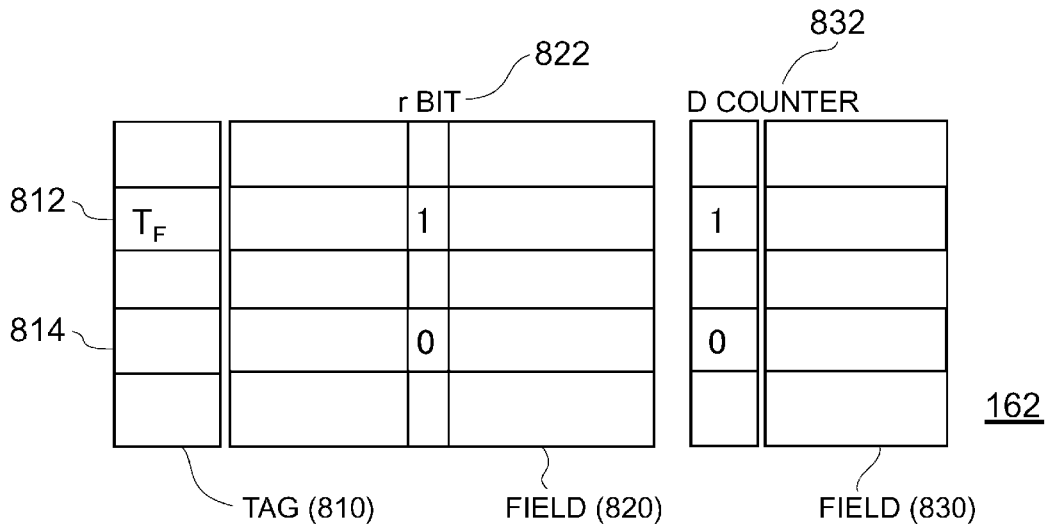
(1) MEASUREMENT TABLE AFTER ARRIVAL OF CHUNK a (782)
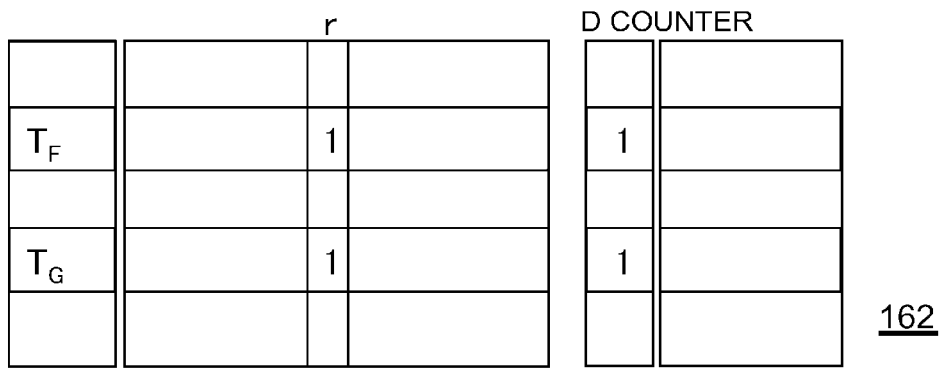
(2) MEASUREMENT TABLE AFTER ARRIVAL OF CHUNK x (784)
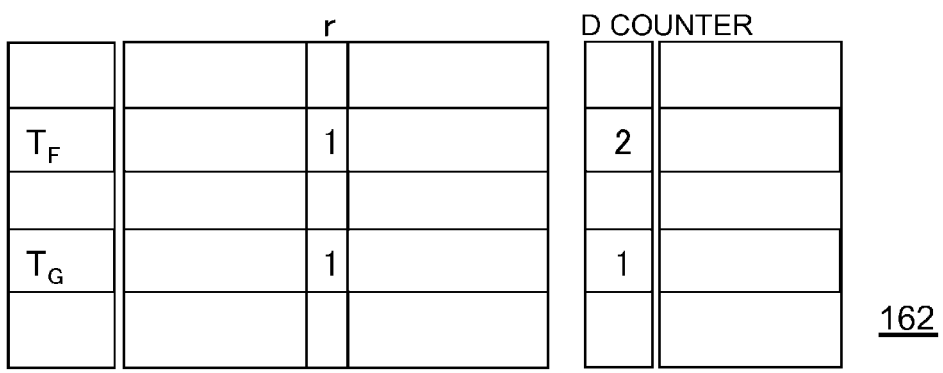
(3) MEASUREMENT TABLE AFTER ARRIVAL OF CHUNK b (784)

FIG. 13
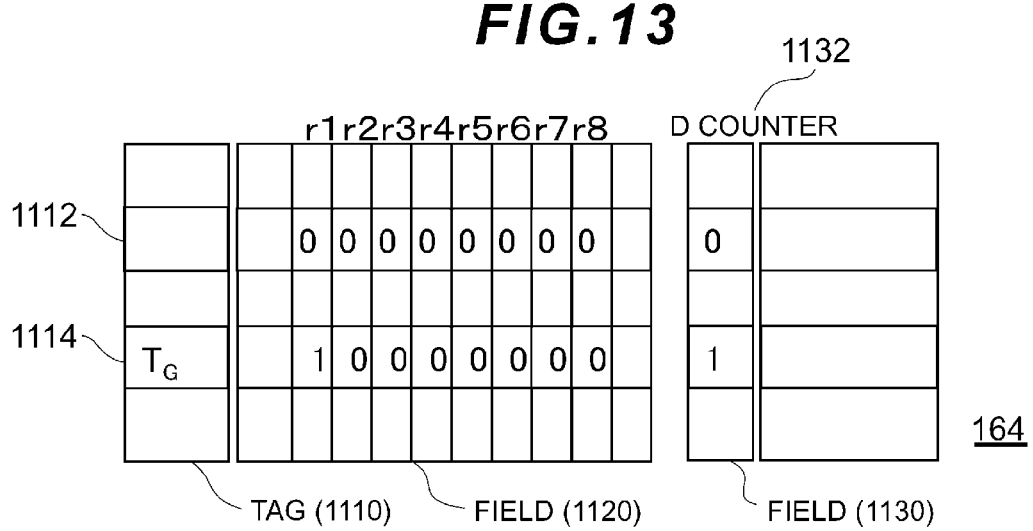
(1) MEASUREMENT TABLE AFTER ARRIVAL OF CHUNK x (1082)
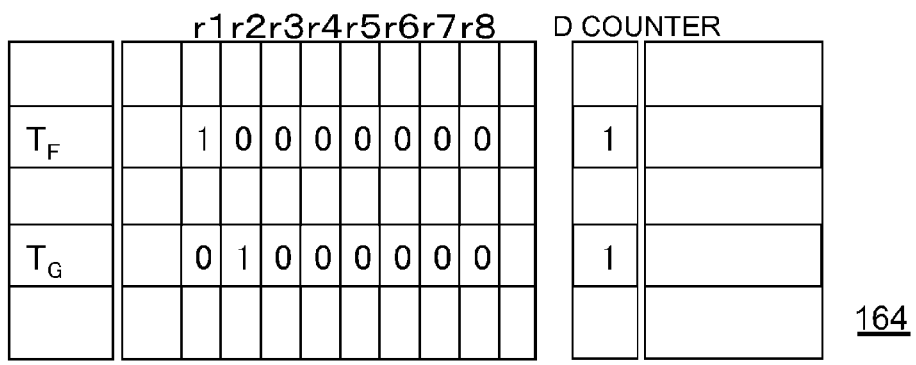
(2) MEASUREMENT TABLE AFTER ARRIVAL OF CHUNK a (1084)
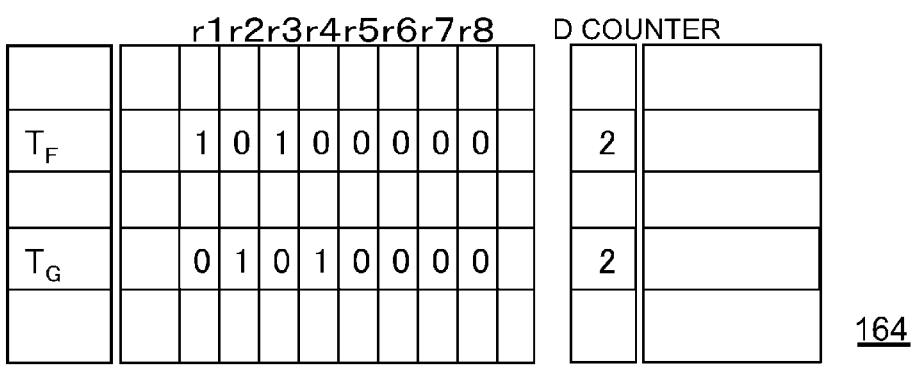
(3) MEASUREMENT TABLE AFTER ARRIVAL OF CHUNK b (1088)

FIG. 16
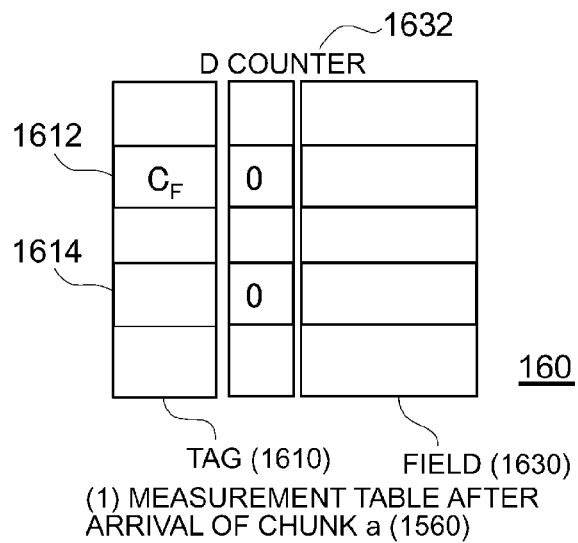
TAG (1610)  FIELD (1630)
(1) MEASUREMENT TABLE AFTER ARRIVAL OF CHUNK a (1560)
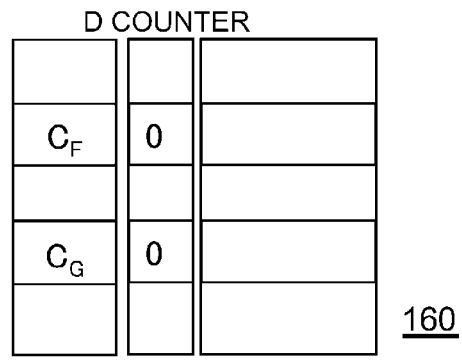
(2) MEASUREMENT TABLE AFTER ARRIVAL OF CHUNK x (1572)
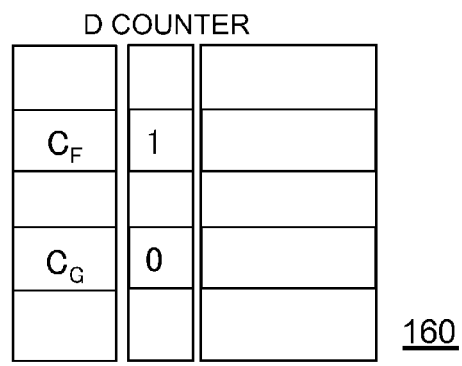
(3) MEASUREMENT TABLE AFTER ARRIVAL OF CHUNK a (1582)

STORAGE APPARATUS AND ADDITIONAL DATA WRITING METHOD

TECHNICAL FIELD

The present invention relates to a storage apparatus and an additional data writing method and is suited for use in a storage apparatus and additional data writing method for aggregating and storing backup data of different generations.

BACKGROUND ART

A storage apparatus connected to a host computer via a network is equipped with, for example, a plurality of hard disk drives (HDD) as storage devices for storing data. When storing data in the storage devices, the amount of data is reduced and then stored in order to reduce costs of storage media. Examples of a method for reducing the amount of data include file compression processing and deduplication processing. The file compression processing reduces a data capacity by condensing data segments with the same content in one file. On the other hand, the deduplication processing reduces a total capacity of data in a file system or a storage system by condensing data segments with the same content detected in not only one file, but also in files.

A data segment that is a deduplication processing unit will be hereinafter referred to as a chunk. Also, logically gathered data that is a unit to be stored in a storage device will be hereinafter referred to as content. Examples of the content can include normal files as well as files such as archive files, backup files, or virtual volume files in which normal files are aggregated. Furthermore, chunks on which the deduplication processing has been executed are stored on a data block basis in the storage devices, wherein a plurality of chunks are gathered in data block units and each data block is called a container.

A specified number or capacity of chunks is set to a container in advance; chunks are gathered until the container becomes full; and once the container becomes full, the chunks are written on a container basis to the storage devices. Then, a container index table indicating which backup data is stored in which container is created in association with each container. For example, if backup data of a plurality of generations are deduplicated and stored in the storage devices, different containers are prepared for different backup generations depending on backup timing and the backup data of each generation is stored in each of the different containers (for example, see Patent Literature 1).

CITATION LIST

Patent Literature

PTL 1: U.S. Pat. No. 6,928,526

Non Patent Literature

NPL 1: Andrew S. Tanenbaum and Albert S. Woodhull, Operating Systems: Design and Implementation, Third Edition, Prentice Hall, 2006. 3.4.7 Simulationg LRU in Software

SUMMARY OF INVENTION

Technical Problem

If the backup data of a plurality of generations are stored in respectively different containers as described above, chunks belonging to deduplicated backup data are highly likely to be distributed and stored in the plurality of containers. In this case, the number of containers to which reference is made at the time of data restoration increases, which results in a problem of degradation of restoration performance. Furthermore, when backing up data, data deduplication processing is executed by referring to a container index table(s); and if the chunks are distributed and stored in the plurality of containers, the deduplication processing is executed by referring to a plurality of container index tables, which results in a problem of degradation of backup performance.

The present invention was devised in consideration of the above-described circumstances and aims at suggesting a storage apparatus and additional data writing method capable of aggregating and storing deduplicated backup data of a plurality of generations.

Solution to Problem

In order to solve the above-described problems, a storage apparatus connected via a network to a host system making a content write request is provided according to the present invention, wherein the storage apparatus includes a storage unit providing one or more containers composed of a specified storage area, and a back up unit storing the content in the container in accordance with a backup request from the host system; and wherein the backup unit cuts out the content into one or more chunks, detects a duplicate chunk, which is a duplicate of a chunk stored in the container, from the cutout chunks, and additionally writes the chunk, other than the duplicate chunk, to the container where the duplicate chunk is stored.

When storing the content in the container in accordance with the backup request from the host system according to the above-described configuration, whether a chunk cut out from the content is a duplicate chunk or not is detected and the chunk, other than the duplicate chunk, included in the content is additionally written to the container where the duplicate chunk is stored. As a result, the plurality of chunks constituting the content can be aggregated and stored in one container, thereby enhancing backup performance and restoration performance of the storage apparatus.

Advantageous Effects of Invention

According to the present invention, the deduplicated backup data of a plurality of generations can be aggregated and stored, thereby enhancing backup performance and restoration performance

BRIEF DESCRIPTION OF DRAWINGS

FIG. 3 is a conceptual diagram explaining backup processing according to the first embodiment.

FIG. 10 is a chart showing the structure of a measurement table according to the second embodiment.

FIG. 13 is a chart showing the structure of a measurement table according to the third embodiment.

FIG. 16 is a chart showing the structure of a measurement table according to the third embodiment.

DESCRIPTION OF EMBODIMENTS

Figure 1:
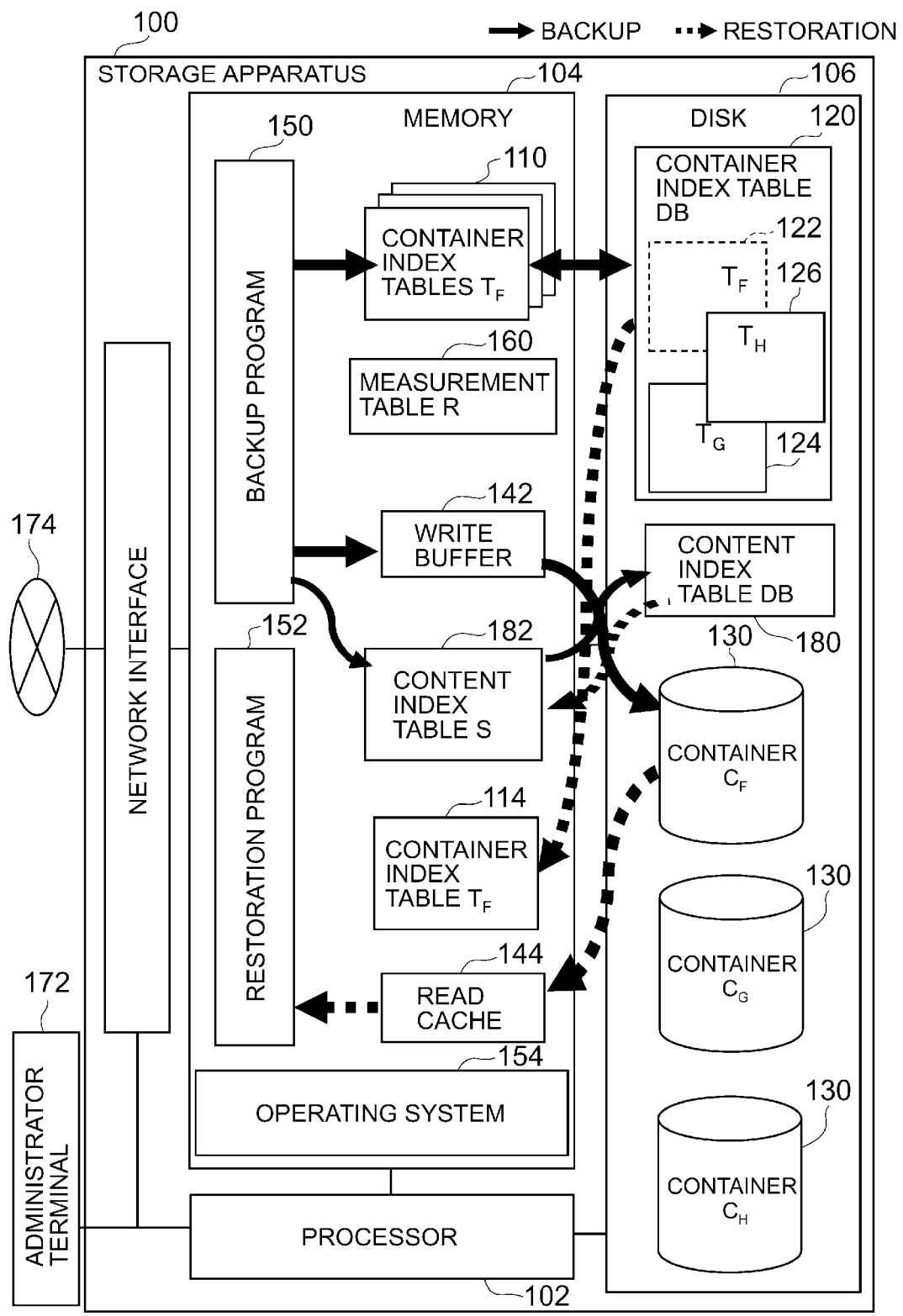
FIG. 1 is a block diagram showing the configuration of a storage apparatus according to a first embodiment of the present invention.

An embodiment of the present invention will be described below in detail with reference to the attached drawings.

(1) First Embodiment (1-1) Outline of this Embodiment

Firstly, the outline of this embodiment will be explained. A storage apparatus connected to a host computer via a network is equipped with, for example, a plurality of hard disk drives (HDD) as storage devices for storing data. When storing data in the storage devices, the amount of data is reduced and then stored in order to reduce costs of storage media. Examples of a method for reducing the amount of data include file compression processing and deduplication processing. The file compression processing reduces a data capacity by condensing data segments with the same content in one file. On the other hand, the deduplication processing reduces a total capacity of data in a file system or a storage system by condensing data segments with the same content detected in not only one file, but also in files.

A data segment that is a deduplication processing unit will be hereinafter referred to as a chunk. Also, logically gathered data that is a unit to be stored in a storage device will be hereinafter referred to as content. Examples of the content can include normal files as well as files such as archive files, backup files, or virtual volume files in which normal files are aggregated. Furthermore, chunks on which the deduplication processing has been executed are stored on a data block basis in the storage devices, wherein a plurality of chunks are gathered in data block units and each data block is called a container.

Regarding chunk-based deduplication processing, whether or not a chunk with the same content is already stored in the hard disk drive is judged before storing an arbitrary chunk in the hard disk drive. If it is determined as a result of the judgment that the chunk is not a duplicate, the chunk is stored directly in the hard disk drive. On the other hand, if it is determined as a result of the judgment that the chunk is a duplicate, such chunk (hereinafter referred to as the duplicate chunk) itself will not be stored in the hard disk drive, but link information indicating a storage location of the chunk will be stored in the hard disk drive. In this way, duplicate chunks are eliminated when storing chunks, by repeatedly executing the duplication judgment of the chunks. Therefore, it is possible to control the usage of the hard disk drives and increase the speed of the backup processing.

The aforementioned container is a unit for accumulating a plurality of chunks in a memory for the storage apparatus wherein the unit is to be stored in the hard disk drives. Furthermore, a container index table for managing the locations of the chunks in a container is created in each container. The container index table stores offset (position in the container) of the relevant chunk and the size of the chunk. The container index table is also used for the chunk duplication judgment.

Generally, the size of a chunk is several kilobytes. So, when executing the duplication judgment processing, processing for sequentially comparing chunks from the top of the chunks requires long processing time and costs much. So, the execution of the duplication judgment processing in a short time and at low cost is made possible by using a message digest of the chunks. The message digest is a technique to output a digest with a fixed length with respect to data input with an arbitrary length. The output result of the message digest will be referred to as a fingerprint (FP) and explained below. The fingerprint can be obtained by using a hash function; and, for example, a function such as the SHA 256, whose result will be a random number with an extremely high probability, and regarding which data of the chunk is highly likely to be uniquely determined by a hash value relative to that data of the chunk, is used.

In this embodiment, the fingerprint of each chunk is stored in the aforementioned container index table and the fingerprints of the chunks are compared at the time of the duplication judgment processing. Accordingly, the higher speed and lower cost of the duplication judgment processing can be implemented as compared to a case where the chunks are compared on a bit basis.

Furthermore, write-once storage devices are used in order to guarantee data integrity and realize highly reliable backups. The write-once storage device is a storage device capable of writing data only once, but reading data many times. Since data written to the write-once storage device once cannot be deleted or modified, the write-once storage device is suited for, for example, archival use for preservation of evidence. For example, optical disk devices can be an example of such storage devices. Generally, magnetic disk devices are not write-once storage devices because they can update written data. However, the magnetic disk devices can be used as the write-once storage devices by allowing only additional data writing, that is, prohibiting overwriting of data by contriving the configuration of a file system and a device driver. The most ideal form of this embodiment can be applied mainly to write-once-type hard disk drives suited for data backups.

A specified number or capacity of chunks is set to the aforementioned container in advance; chunks are gathered until the container becomes full; and once the container becomes full, the chunks are written on a container basis to the storage devices. In other words, in a case of the write-once-type hard disk drives, the chunks are written to the container until the container becomes full. Then, the container index table showing which backup data is stored in which container is created corresponding to each container. For example, if backup data of a plurality of generations are deduplicated and stored in the storage devices, different containers are prepared for different backup generations depending on backup timing and the backup data of each generation is additionally written to each of the different containers.

If the backup data of a plurality of generations are stored in respectively different containers as described above, chunks belonging to deduplicated backup data are highly likely to be distributed and stored in the plurality of containers. In this case, the number of containers to which reference is made at the time of data restoration increases, which results in a problem of degradation of restoration performance. Furthermore, when backing up data, data deduplication processing is executed by referring to a container index table(s); and if the chunks are distributed and stored in the plurality of containers, the deduplication processing is executed by referring to a plurality of container index tables, which results in a problem of degradation of backup performance.

So, when deduplicating and storing the backup data of a plurality of generations in the storage devices, the backup data of the plurality of generations having the same content are aggregated and stored in one container according to this embodiment. When additionally writing the backup data to a write-once-type container, the above-described aggregation and storage of the backup data can be realized by comparing data stored in the existing container with the backup target data. For example, if the backup target data is backup data having the same content as the content stored in the existing container, the backup data is additionally written to that container. On the other hand, if the backup target data is not backup data having the content stored in the existing container, a new container is created and the backup data is additionally written to that container. As a result, the deduplicated backup data of the plurality of generations can be aggregated and stored.

(1-2) Structure of Storage Apparatus

Next, a hardware structure of the storage apparatus 100 will be explained. Referring to FIG. 1, the storage apparatus 100 is connected to a host system such as a backup server (not shown) via a network 174. The network 174 may be, for example, a LAN (Local Area Network), the Internet, public lines, or private lines.

Furthermore, the storage apparatus 100 is connected to an administrator terminal 172 via a network. The administrator terminal 172 is a computer device equipped with information processing resources such as a CPU and a memory and records logs of, for example, operation results and failure occurrence as it issues instruction to start or stop the storage apparatus 100 in accordance with input by, for example, an operator and monitors the operation of the storage apparatus 100. The administrator terminal 172 also specifies system settings regarding backup processing and restoration processing in the storage apparatus 100. An example of the administrator terminal 172 can be a personal computer composed of, for example, a display, a keyboard, a processor, and storage devices.

The storage apparatus 100 is mainly constituted from a processor 102, a memory 104, a disk 106, and a network interface 108.

The processor 102 functions as an arithmetic processing unit and controls the operation of the storage apparatus 100 in accordance with, for example, programs and operation parameters stored in the memory 104.

The memory 104 stores an operating system 154, various programs operating in cooperation with the operating system 154, a backup program 150, a restoration program 152, and various tables.

The backup program 150 stores backup target data, which are provided via the network, in the disk 106 by using container index tables 110, a measurement table 160, and a write buffer 142.

Although there are a plurality of container index tables 110, a container index table 110 used by the backup program 150 will be explained as a container index table 112 and a container index table 110 used by the restoration program 152 will be explained as a container index table 114. The container index table 110 is a table for managing chunk storage locations on a container basis. The structure of the container index table 110 will be explained later in detail.

The container index table 110 is created for each container. When the backup program 150 executes the duplication judgment processing, it refers to the fingerprints in at least one or more container index tables 110. So, it is necessary to load data of the container index tables into the memory 104. However, since the memory 104 is limited, it is difficult to load data of all the container index tables 110 into the memory 104. Therefore, the limited resources of the memory 104 are utilized by means of rollin of the container index table 110 from the disk 106 to the memory 104 and roll-out of the container index table from the memory 104 to the disk 106.

In this embodiment, the roll-in/roll-out of the memory 104 is performed by an LRU (Least Recently Used) method. By the LRU method, data in the memory 104 to which reference has not been made for the longest period of time is rolled out and data in the disk 106 is rolled in. This is based on the characteristics of data to which reference has not been made for the longest period of time, that is, such data is least likely to be a target of reference next time. Since the roll-in/roll-out control technique of the memory 104 requires transparent access to the memory 104 and the disk 106, it is provided by the operating system 154 or the processor 102 and called a virtual memory management technique. Page replacement processing in virtual memory is executed by using three kinds of bits, that is, a reference bit (r bit), an update bit (c bit), and a valid/invalid bit (v bit). These bits are updated every time a chunk included in the content arrives.

In this embodiment, such virtual memory management technique is realized by using the container index tables.

For example, if a duplicate chunk is included in the content, the reference bit (r bit) of a container storing that chunk is set to "1." Moreover, when writing a chunk included in the content to the disk 106, the update bit (c bit) of a container storing that chunk is set to "1." Furthermore, when rolling in the relevant container index table, the v bit is set to "1"; and when rolling out the relevant container index table, the v bit is set to "0."

Furthermore, one of methods for implementing the LRU method is an aging method (for example, see Non Patent Literature 1). The aging method uses a plurality of reference bits (r bits). Regarding the reference bits (r bits) using a plurality of bits, a bit value is shifted to the right at every specified time interval. Particularly, when reference is made, the bit value is shifted to the right and then the most significant bit is set to 1. Such shift processing makes it possible to easily realize weighting explained below. For example, if reference time is in the past, the weighting is reduced; and as the reference time is closer to the present, the weighting is increased. For example, the reference bits obtained with respect to certain data five times at a specified time interval are as follows:

$1^{st}$ time: 1
$2^{nd}$ time: 0
$3^{rd}$ time: 1
$4^{th}$ time: 0
$5^{th}$ time: 0

If the above reference bits are weighted and expressed with an 8-bit counter, the following values are obtained.

An initial value is 00000000.

$1^{st}$ time: 10000000

$2^{nd}$ time: 01000000

$3^{rd}$ time: 10100000

$4^{th}$ time: 01010000

$5^{th}$ time: 00101000

As the reference bit (r bit) is expressed with the 8-bit counter as described above, data to which reference was made in the past becomes a small value and data regarding which reference time is closer to the present becomes a larger value.

The measurement table 160 is a table for managing additional write locations of chunks in a container, managing roll-in/roll-out of the container index tables 110, and manages whether a duplicate chunk(s) exists or not as well as the number of duplicate chunks on a container basis. The management table about the roll-in/roll-out of the container index tables 110 and the management table about the duplicate chunks may be either one table or separate tables. In this embodiment, the management table about the roll-in/roll-out and the management table about the duplicate chunks are managed by one table. The structure of the measurement table 160 will be explained later in detail.

The restoration program 152 reads backup data stored in the disk 106 by using a content index table 182, the container index table 114, and a read cache 144.

The content index table 182 is a table for managing chunk storage locations on a content basis. The structure of the content index table 182 will be explained later in detail.

The disk 106 is composed of, for example, hard disk drives and stores a container index table DB 120, a content index table DB 180, and a plurality of containers (containers 130, 132, 134 in FIG. 1). The container index table DB 120 stores a plurality of container index tables and the content index table DB 180 stores a plurality of content index tables. Furthermore, the container 130 and others store backup data on which the deduplication processing has been executed by the backup program 150.

(1-3) Outline of Backup Processing and Restoration Processing

Figure 2:
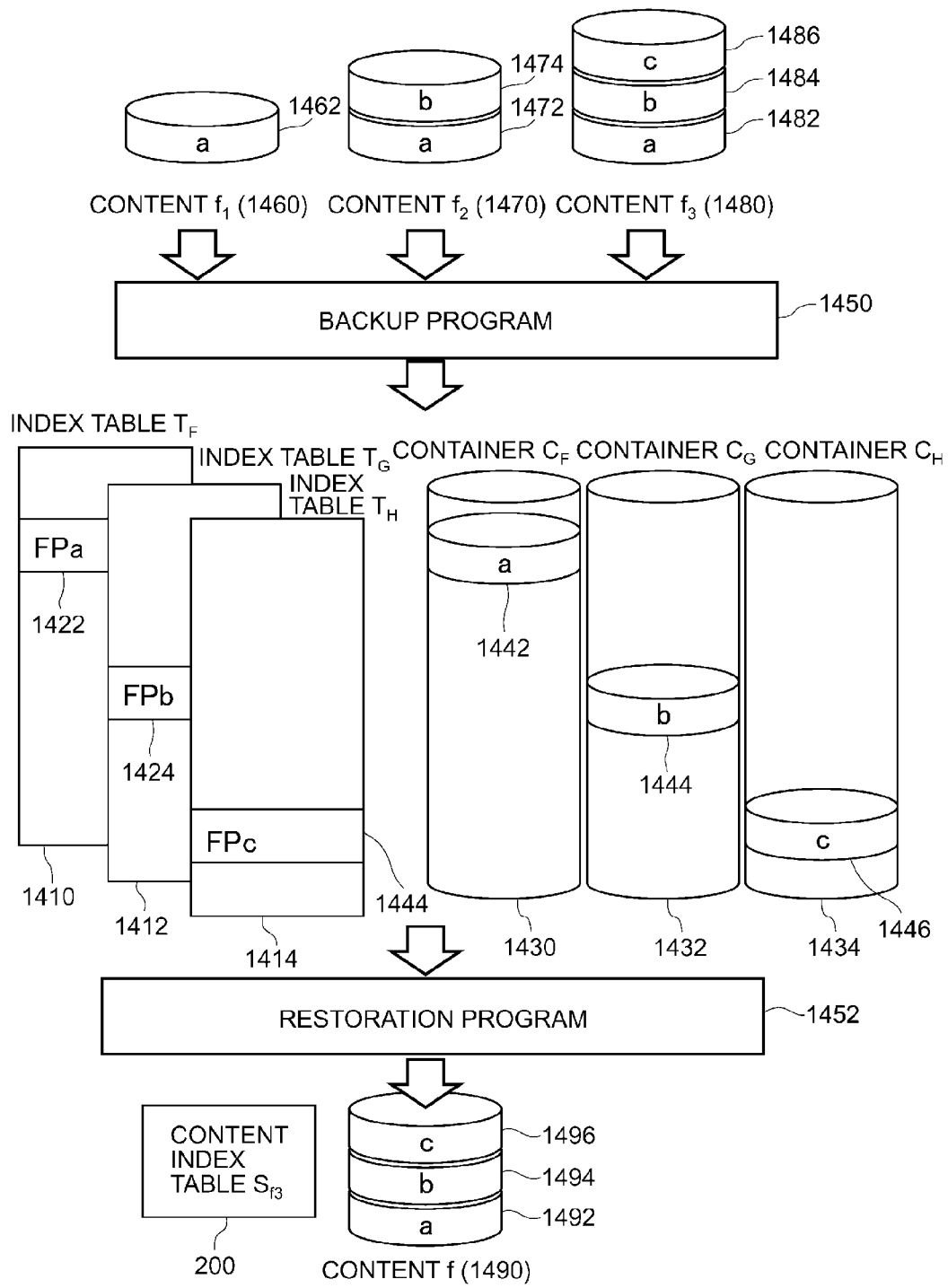
FIG. 2 is a conceptual diagram explaining conventional backup processing and restoration processing.

Before explaining backup processing and restoration processing according to this embodiment, conventional backup processing and restoration processing will be explained. As shown in FIG. 2, the backup program 1450 backs up content f1 (1460), content f2 (1470), and content f3 (1480) which have sequentially arrived as backup target data. The content f1 includes chunk a, the content f2 includes the chunk a and chunk b, and the content f3 includes chunk c in addition to the chunk a and the chunk b as shown in FIG. 2. Since the deduplication processing is executed on the content f1 to f3 by the backup program 1450, the chunk a, the chunk b, and the chunk c are stored in the containers 1430 and others.

For example, it is assumed that an interval between the arrival of the content and the arrival of another content is large and there is a large interval between a backup of the content f1 and a backup of the content f2. In this case, container CF (1430) becomes filled with chunks of another backup target after storing the chunk a of the content f1 in the container CF (1430) and before storing the chunk b of the content f2 in the container CF (1430), so that the chunk b will be stored in container CG (1432) which is different from the container where the chunk a is stored. Similarly, the chunk c of the content f3 will be stored in container CH (1434) which is different from the containers where the chunk a and the chunk b are stored. Furthermore, container index tables TF (1410) and others are created corresponding to their relevant containers.

If the backup data of three generations having the same content are distributed and stored in three containers as described above, it is necessary to refer to the three containers when restoring the data. Also, when backing up the data, the data deduplication processing is executed by referring to the container index tables 1410 and others; and it is necessary to execute the deduplication processing by referring to the three container index tables 1410 and others corresponding to the three containers. In this embodiment, backup data of a plurality of generations having the same content are aggregated and stored in one container, so that the deduplication processing is executed by referring to one container when restoring the data, or referring to one container index table when baking up the data.

(1-3-2) Details of Backup Processing

Next, the details of the backup processing according to this embodiment will be explained with reference to FIG. 3. Similarly to the case shown in FIG. 2, the backup program 150 backs up content f1 (260), content f2 (270), and content f3 (280) which have sequentially arrived as backup target data.

In this embodiment, container CF (230) is equipped with a basic area 232 and an extended area 234 as shown in FIG. 3. Regarding the container index table TF (110), a table corresponding to the basic area and the extended area of the container CF (130) is prepared in the same manner. The container index table TF (110) stores information about, for example, fingerprints, offset, and lengths of chunks stored in the container CF.

For example, at the time of program activation, the backup program 150 specifies the size of the basic area and extended area of the container index table 110 and the size of the basic area and extended area of the container 130. The size may be specified as, for example, byte size of the disk storage capacity. Also, the size of the basic area and extended area may be specified as the number of chunks. For example, the number of chunks as the basic area of the container index table 110 is specified as 600 chunks, the number of chunks as the extended area of the container index table 110 is specified as 400 chunks, the number of chunks as the basic area of the container 130 is specified as 600 chunks, and the number of chunks as the extended area of the container 130 is specified as 400 chunks. These numbers of chunks are specified according to input by the operator, using commands or similar via the administrator terminal 172. If no specification is made via the administrator terminal 172, the above-described size may be stored as initial values in, for example, initial files in advance and the initial values may be read at the time of activation of the backup program 150.

The backup program 150 creates a new container CF (230) for storing the content f1 and stores the chunk a in a basic area 232 of the container CF (230). The backup program 150 secures an extended area 234 of the container CF in order to store backup data of the same content as that of the content f1.

When backing up the content f2, the chunk b other than the chunk a which is a duplicate, from among the chunk a and the chunk b, is stored in the extended area of the container CF (230). Similarly, when backing up the content f3, the chunk c other than the chunk a and the chunk b which are duplicates, from among the chunk a, the chunk b, and the chunk c, are stored in the extended area of the container CF (230). Then, management information of the chunk a, the chunk b, and the chunk c is stored respectively in the container index table TF (210).

Therefore, when restoring the content f3 including the chunk a, the chunk b, and the chunk c, the restoration program 152 can read the content f3 by referring to only the container CF (230). Furthermore, when backing up the same content as that of the content f1 to f3, the restoration program 152 can execute the deduplication processing by referring to only the container index table TF.

Figures 4A, 4B:
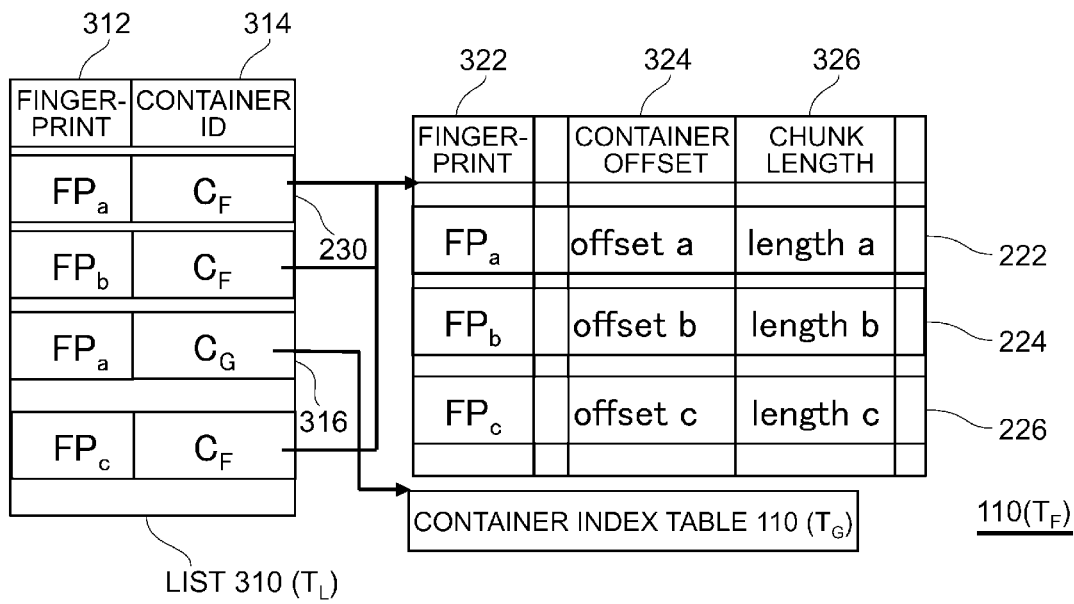
FIG. 4A is a chart showing the structure of a container index table according to the first embodiment.
FIG. 4B is a chart showing the structure of a content index table according to the first embodiment.

Next, the structure of the container index table 110 will be explained with reference to FIG. 4A. The container index table 110 is a table created on a container basis and is a table for managing chunks stored in the relevant container. The container index table 110 is constituted from a fingerprint column 322, a container offset column 324, and a chunk length column 326. The fingerprint column 322 stores a fingerprint of the relevant chunk. The container offset column 324 stores the offset of the relevant chunk in the container. The chunk length column 326 stores information indicating the length of the relevant chunk. In other words, the management information of each chunk is stored in each line of the container index table 110. For example, the container index table 110 in FIG. 4A shows a state after the arrival of the content f3 shown in FIG. 3 and stores management information 222 of the chunk a, management information 224 of the chunk b, and management information 226 of the chunk c.

Furthermore, a plurality of container index tables are managed by a list 310. Regarding the list 310, a container ID 314 for identifying the relevant container is associated with a fingerprint 312 of the relevant chunk. The container ID 314 is also used as pointer information enabling reference to the container index table 110. In this embodiment, the container ID (CF) and its corresponding container index table (TF) use a common identifier called uuid (Universally Unique Identifier). For example, three files, that is, a container, a container index table, and a content index table exist in the disk 106 and are located under three directories, respectively.

Container/uuid-Cf a main body of the container
ChunkIndex/uuid-Cf a container index table database (a file storing the table TF)
Contents/uuid-Cf a content index table database
For example, if the content ID is CF, it is possible to refer to the chunk a, the chunk b, and the chunk c of the container CF by tracing the container index table TF.

Next, the structure of the content index table 182 will be explained with reference to FIG. 4B. The content index table 182 is a table created on a content basis and is a table for managing chunks included in the relevant content. The content index table 182 is constituted from a content ID column 361, a fingerprint column 362, a container ID column 364, a content offset column 366, and a chunk length column 368. The content ID column 361 stores information for identifying the relevant content. The fingerprint column 362 stores a fingerprint of the relevant chunk. The container ID column 364 stores identification information of a container where the relevant chunk is stored. The content offset column 366 stores information showing the position of the relevant chunk in the content. The chunk length column 368 stores information showing the chunk length.

For example, the content index table 182 (Sf3) in FIG. 4B stores information of the content f3 shown in FIG. 3. Specifically speaking, the content f3 includes the chunk a, the chunk b, and the chunk c and the content can be reconstructed according to the offset and chunk length of each chunk. Also, since each chunk is associated with the content ID, in which container each chunk is stored can be found.

The chunk offset (366) and the chunk length (368) constituting the content index table 182 indicate a logical location of the relevant chunk in the content. Furthermore, the chunk offset (324) and the chunk length (326) constituting the aforementioned container index table 110 indicate a physical location of the relevant chunk in the disk 106. When executing the restoration processing, reference is made to the content index table 182, the container ID of each chunk is obtained, and the container index table 110 is searched based on that container ID. Then, the physical location of each chunk is obtained based on the information stored in the container index table 110 and those chunks are read from the disk 106, and then the content is reconstructed according to the logical location of the content index table 182.

Figure 5:
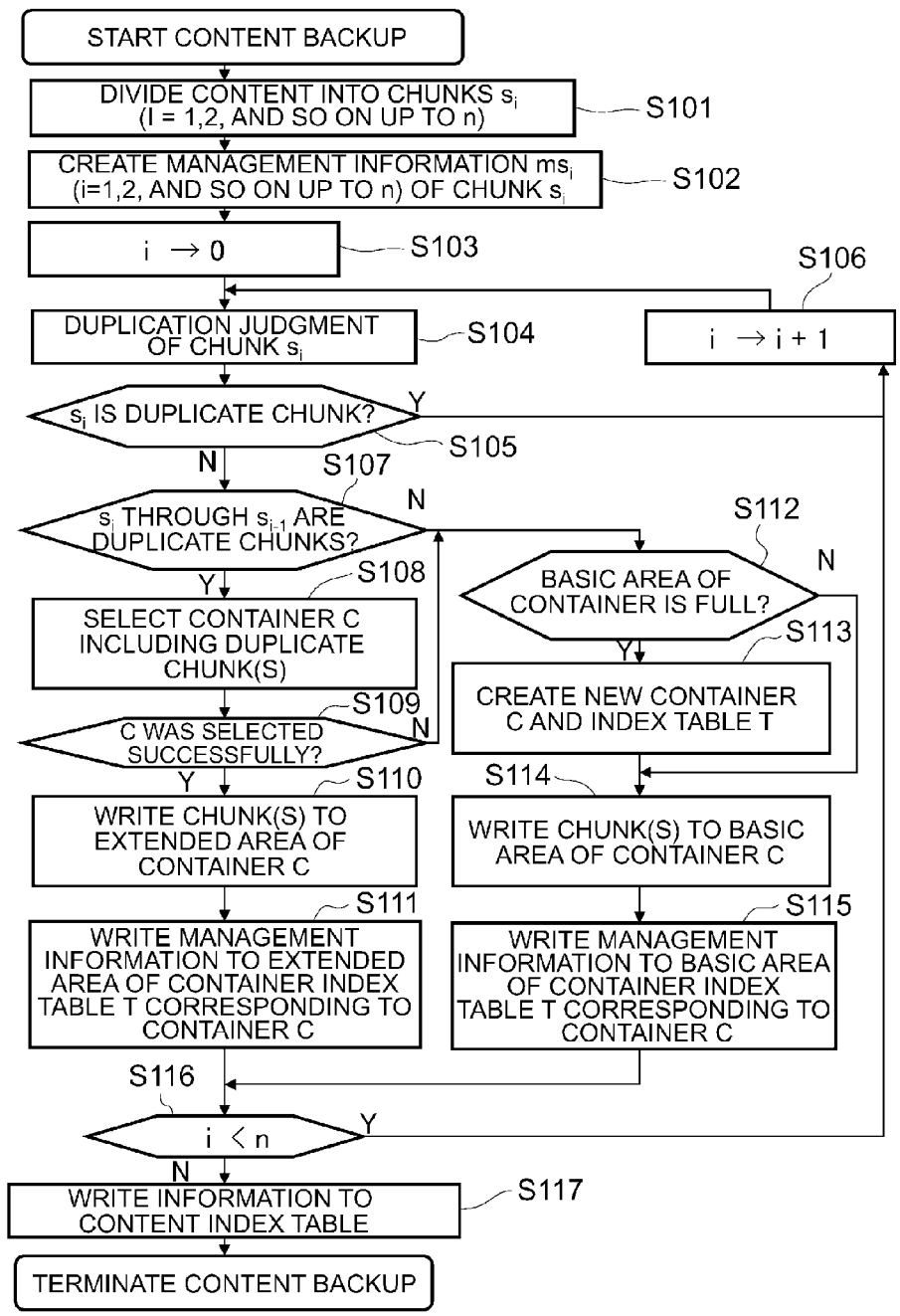
FIG. 5 is a flowchart illustrating a processing sequence for backup processing according to the first embodiment.

Next, the backup processing executed by the backup program 150 will be explained. As shown in FIG. 5, the backup program 150 decomposes the content, which is a backup target, into chunks Si (i=1, 2, n) (S101).

Then, the backup program 150 creates the management information of the chunk Si (S102). The management information of the chunk is information about the fingerprint of the chunk, the position (offset) of the chunk in the content, and the length of the chunk.

Subsequently, the backup program 150 initializes counter i used for loop processing (i=0) (S103) and executes the duplication judgment on the chunk Si (S104). Specifically speaking, the backup program 150 judges whether or not a fingerprint identical to the fingerprint of the chunk obtained by decomposition in step S101 is included in the list 310 shown in FIG. 4A. If the fingerprint of the chunk matches with the fingerprint in the list 310, the backup program 150 determines that duplication exists; and if the fingerprint of the chunk does not match with the fingerprint in the list 310, the backup program 150 determines that duplication does not exist.

It is desirable that the list 310 be read to the memory 104 at the time of activation of the backup program 150 and be resident in the memory 104. However, if the number of entries (lines) in the list 310 is large and all the entries of the list 310 are read to and kept in the memory 104, the memory capacity of the memory 104 will be overstrained. Therefore, only the entries necessary for the duplication judgment processing are read to the memory 104 as cache, so that the number of times of input to, and/or output from, the disk 106 can be reduced without overstraining the memory capacity of the memory 104.

In this embodiment, only the necessary entries in the list 310 can be read to the memory 104 as cache by executing the duplication judgment processing by using both the list 310 and the container index table 110. For example, it is assumed that the content f1 to f3 shown in FIG. 3 are aggregated in the container CF. If it is confirmed that the chunk a included in the content f3 is stored in the container CF, it is possible to search the chunk b and the chunk c other than the chunk a by limiting a search range to the range of the container index table TF corresponding to the container CF. If the chunk b or the chunk c, other than the chunk a, cannot be found in the range of the container index table TF, it is possible to determine at high speed that these chunks are not duplicate chunks. In this way, reference is made to the container index table RF as the cache for the duplication judgment processing. This is a particularly effective means when the number of entries in the list 310 is extremely large as compared to the number of entries in the container index table TF.

Then, if it is determined as a result of the duplication judgment processing in S104 that the chunk Si is a duplicate chunk (S105), the backup program 150 adds 1 to the counter I and repeats the duplication judgment processing in step S104 on the next chunk. On the other hand, if it is determined that the chunk Si is not a duplicate chunk (S105), the backup program 150 executes the processing in step S107.

If it is determined in step S105 that the chunk Si is not a duplicate chunk, the backup program 150 judges whether at least one of chunks S1 through Si−1 on which the duplication judgment processing was executed in the past is a duplicate chunk or not (S107).

If it is determined in step S107 that at least one of chunks Si through Si−1 is a duplicate chunk, the backup program 150 selects a container including the relevant duplicate chunk (108). The container selection processing in step S108 will be explained later in detail.

Next, the backup program 150 judges whether container C including the relevant duplicate chunk was selected successfully in step S108 (S109). If the container C was selected successfully in step S109, the backup program 150 writes the chunk Si to the extended area of the selected container C (S110). Then, the backup program writes management information msi of the chunk Si, which was written in step S110, to the extended area of the container index table T corresponding to the container C (S111). For example, when the content f2 shown in FIG. 3 arrives or when the content f3 arrives, the container CF including the duplicate chunk a or b is selected and the processing in step S108 to step S111 is executed.

If it is determined in step S107 that no duplicate chunk exists, the backup program 150 judges whether the basic area of the present container is full or not (S112). The basic area of the present container means the basic area of a container most recently used by the backup program 150.

If it is determined in step S112 that the basic area of the container is full, the backup program 150 creates a new container C and its corresponding container index table T (S113). If it is determined in step S112 that the basic area of the container is not full, the backup program 150 proceeds to processing in step S114.

Then, the backup program 150 writes the chunk Si to the basic area of the container C (S114) and writes the management information msi, such as the fingerprint, of the container C to the basic area of the container index table T corresponding to the container C (S115). For example, if the content f1 shown in FIG. 3 arrives, the processing from step S112 to step S115 is executed.

Figure 6:
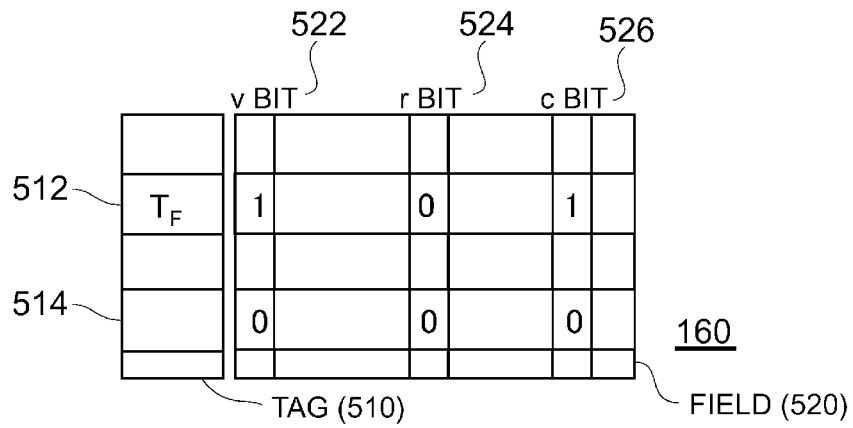
FIG. 6 is a chart showing the structure of a measurement table according to the first embodiment.

Now, the specific structure of the measurement table 160 used during the backup processing will be explained. As shown in FIG. 6, the measurement table 160 manages the valid/invalid bit (v bit), the reference bit (r bit), and the update bit (c bit).

A case where chunks included in the content f1 to f3 shown in FIG. 3 have arrived at the storage apparatus 100 will be explained as an example. When the chunk arrives, the measurement table 160 is updated sequentially.

Firstly, when the chunk a (262) of the content f1 (260) shown in FIG. 3 arrives, the update bit (c bit) is set to 1 because the chunk a is not a duplicate chunk. Then, the management information of the chunk a is written to the basic area (212) of the container index table TF (210). Subsequently, the chunk a is written to the basic area 232 of the container CF (230).

Next, when the chunk a (272) of the content f2 (270) arrives, the reference bit (r bit) is set to 1 because the chunk a is a duplicate chunk. Subsequently, when the chunk b (274) of the content f2 (270) arrives, the update bit (c bit) is set to 1 because the chunk b is not a duplicate chunk. Then, the management information of the chunk b is written to the extended area (214) of the container index table TF (210). Subsequently, the chunk b (244) is written to the extended area 234 of the container CF (230).

Next, when the chunk a (282) of the content f3 (280) arrives, the reference bit (r bit) is set to 1 because the chunk a is a duplicate chunk. Then, when the chunk b (284) arrives, the reference bit (r bit) remains to be 1 because the chunk b is also a duplicate chunk. Subsequently, when the chunk c (286) arrives, the update bit (c bit) is set to 1 because the chunk c is not a duplicate chunk. Then, the management information of the chunk c is written to the extended area (214) of the container index table TF (210). Subsequently, the chunk c (246) is written to the extended area 234 of the container CF (230).

Figure 7:
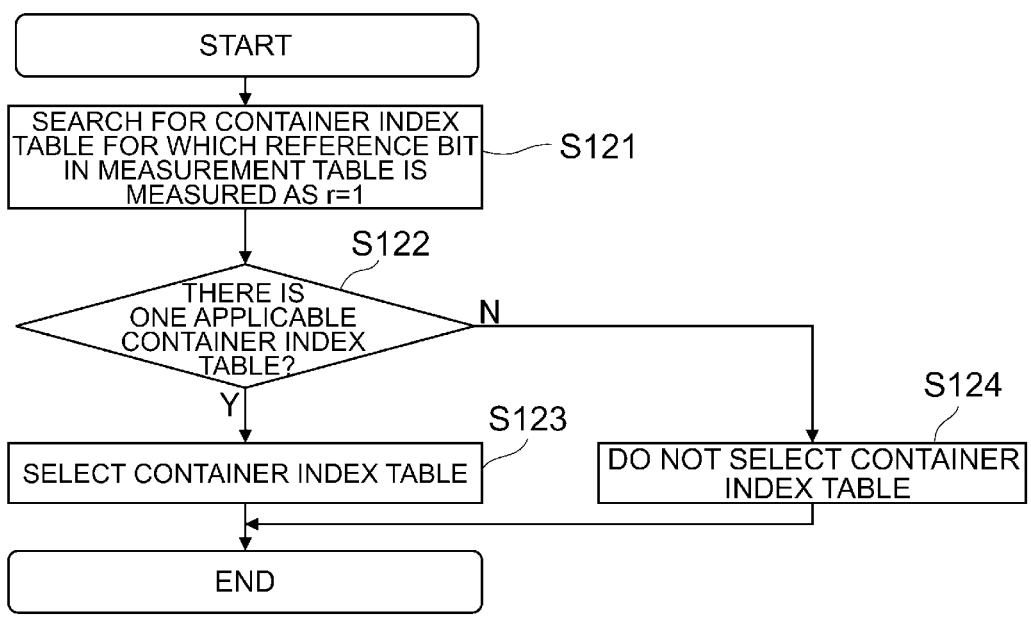
FIG. 7 is a flowchart illustrating a processing sequence for container selection processing according to the first embodiment.

Next, the container selection processing in step S108 will be explained with reference to FIG. 7. As shown in FIG. 7, the backup program 150 searches for the container index table 110 for which the reference bit (r bit) in the measurement table 160 is 1 (S121). A case where the reference bit (r bit) in the measurement table 160 is 1 as mentioned above is a case where the corresponding chunk is a duplicate chunk. Therefore, as a result of searching for the container index table 110 corresponding to the container 130 in which the same chunk as the duplicate chunk is stored, the content having the same chunk as the duplicate chunk (for example, first-generation backup data) and the content including the duplicate chunk (for example, second-generation backup data) can be managed by using the same container 130 and the container index table 110.

Subsequently, the backup program 150 judges whether or not there is one container index table 110 obtained as a result of the search in step S121 (S122). If it is determined in step S122 that there is one applicable container index table 110, the backup program 150 selects that container index table 110 (S123) and terminates the processing. On the other hand, if it is determined in step S122 that the number of applicable container index table 110 is not one, that is, there are two or more applicable container index tables 110, the backup program 150 does not select the container index table 110 (S124) and terminates the processing.

Referring to FIG. 7, if there is one container storing a duplicate chunk, the backup program 150 selects the container index table 110 corresponding to the container which stores the relevant chunk. On the other hand, if there are two or more containers which store a duplicate chunk(s), the backup program 150 does not selects the container index table 110 and proceeds to the processing in step S109 shown in FIG. 5. Specifically speaking, if there are two or more containers which store a duplicate chunk(s), the backup program 150 checks if the container 130 is full or not, and then stores the chunk in the basic area of the container 130 or creates a new container 130 and stores the chunk in that container 130 in the same manner as normal chunk write processing.

Referring back to FIG. 5, the backup program 150 judges whether the duplication judgment processing and the write processing on all the chunks have terminated or not (S116). Specifically speaking, the backup program 150 compares the number of chunks included in the content (n) with the number of counters of the counter i.

If it is determined in step S116 that the duplication judgment processing and the write processing on all the chunks have terminated, the backup program 150 associates information of the content with the management information of the chunks included in the content and writes them to the content index table 182 (S117) and thereby terminates the content backup processing. On the other hand, if it is determined in step S116 that the duplication judgment processing and the write processing on all the chunks have not terminated, the backup program 150 adds 1 to the counter i (S106) and repeats the processing in step S104 and subsequent steps.

(1-3-3) Details of Restoration Processing

Figure 8:
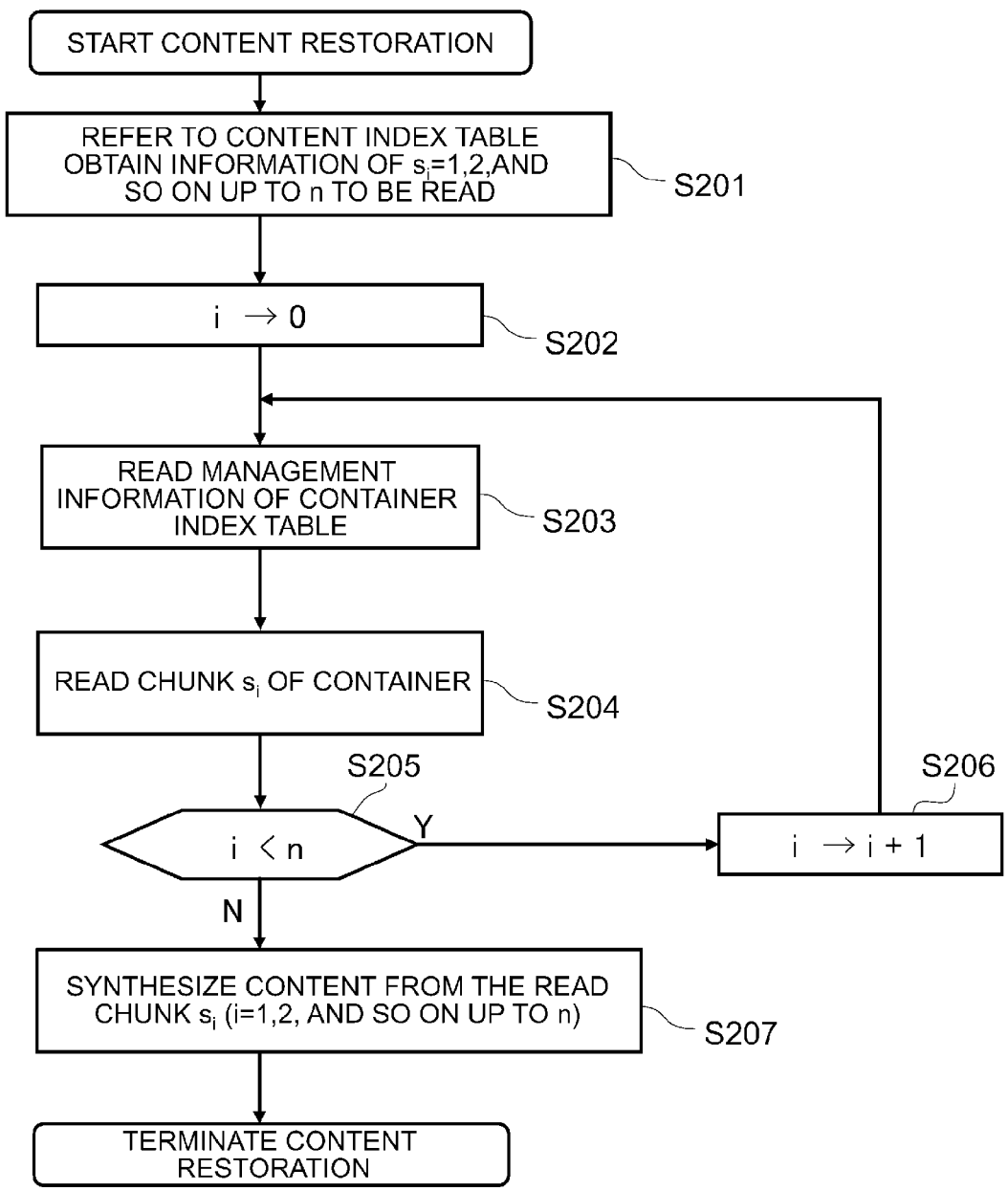
FIG. 8 is a flowchart illustrating a processing sequence for restoration processing according to the first embodiment.

Next, the details of the restoration processing according to this embodiment will be explained with reference to FIG. 8. The restoration program 152 firstly refers to the content index table 182 and obtains information of chunks Si (Si=1, 2 and so on up to n) included in read target content (S201). Specifically speaking, the restoration program 152 creates a list of the chunks Si which need to be read from the content index table 182.

Next, the restoration program 152 sets 0 to the counter i (S202). Then, the restoration program 152 reads the management information of the container index table 140 (S203). Specifically speaking, the restoration program 152 reads the container index table 140, to which the relevant chunk Si belongs, from the disk 106 based on the information of the chunk Si in the content index table 182 which was obtained in step S201 and reads the management information of that chunk. The management information of the chunk means, for example, information about the fingerprint of the chunk, the position of the chunk in the container, and the length of the chunk as mentioned earlier.

Then, the restoration program 152 reads the chunk Si stored in the container 130 corresponding to the container index table 140 based on the management information of the chunk which was read in step S203 (S204).

Subsequently, the restoration program 152 judges whether or not the read processing has terminated with respect to all the chunks included in the restoration target content (S205). Specifically speaking, the restoration program 152 compares the number of chunks included in the content (n) with the number of counters of the counter i.

If it is determined in step S205 that the read processing has terminated with respect to all the chunks, the restoration program 152 synthesizes the content from the read chunks Si (i=1, 2 and so on up to n) (S207) and terminates the restoration processing. Specifically speaking, the restoration program 152 synthesizes the content from the chunks Si, which were read in step S204, based on the offset-in-content information and the chunk length information in the content index table 182. On the other hand, if it is determined in step S205 that the read processing has not terminated with respect to all the chunks, the restoration program 152 adds 1 to the counter i (S206) and executes the processing in step S203 and subsequent steps.

(1-4) Advantageous Effect of this Embodiment

When backing up the content, whether or not a chunk cut out from the content is a duplicate chunk is detected and a chunk(s) other than the duplicate chunk included in the content is additionally written to the container where the duplicate chunk is stored according to this embodiment as described above. As a result, it is possible to aggregate and store a larger number of chunks in one container with regard to a plurality of chunks constituting the content, thereby enabling enhancement of the backup performance and the restoration performance of the storage apparatus 100.

(2) Second Embodiment

(2-1) Outline of this Embodiment

Firstly, the outline of this embodiment will be explained. The first embodiment is designed so that if a duplicate chunk(s) is stored in a plurality of containers in step S122 shown in FIG. 7, an additional write location of the backup target content cannot be selected and it is necessary to create a new container. However, in this embodiment, an additional write location of the backup target content can be selected even if a duplicate chunk(s) is stored in a plurality of containers.

When the backup target content arrives, the backup program 150 measures the number of duplicate chunks in each container according to this embodiment. If the duplicate chunk(s) included in the content is stored in the plurality of containers, the backup program 150 compares the measured number of duplicate chunks in each container and selects a container with a large number of duplicate chunks as the additional content write location. As a result, it is possible to decide to which container the content should be additionally written when there are two or more selected containers in step S108 shown in FIG. 6 (selection of the container(s) as the additional write location(s)).

(2-2) Configuration of Storage Apparatus

Since the configuration of the storage apparatus 100 according to this embodiment is almost the same as that in the first embodiment, its detailed explanation has been omitted.

Figure 9:
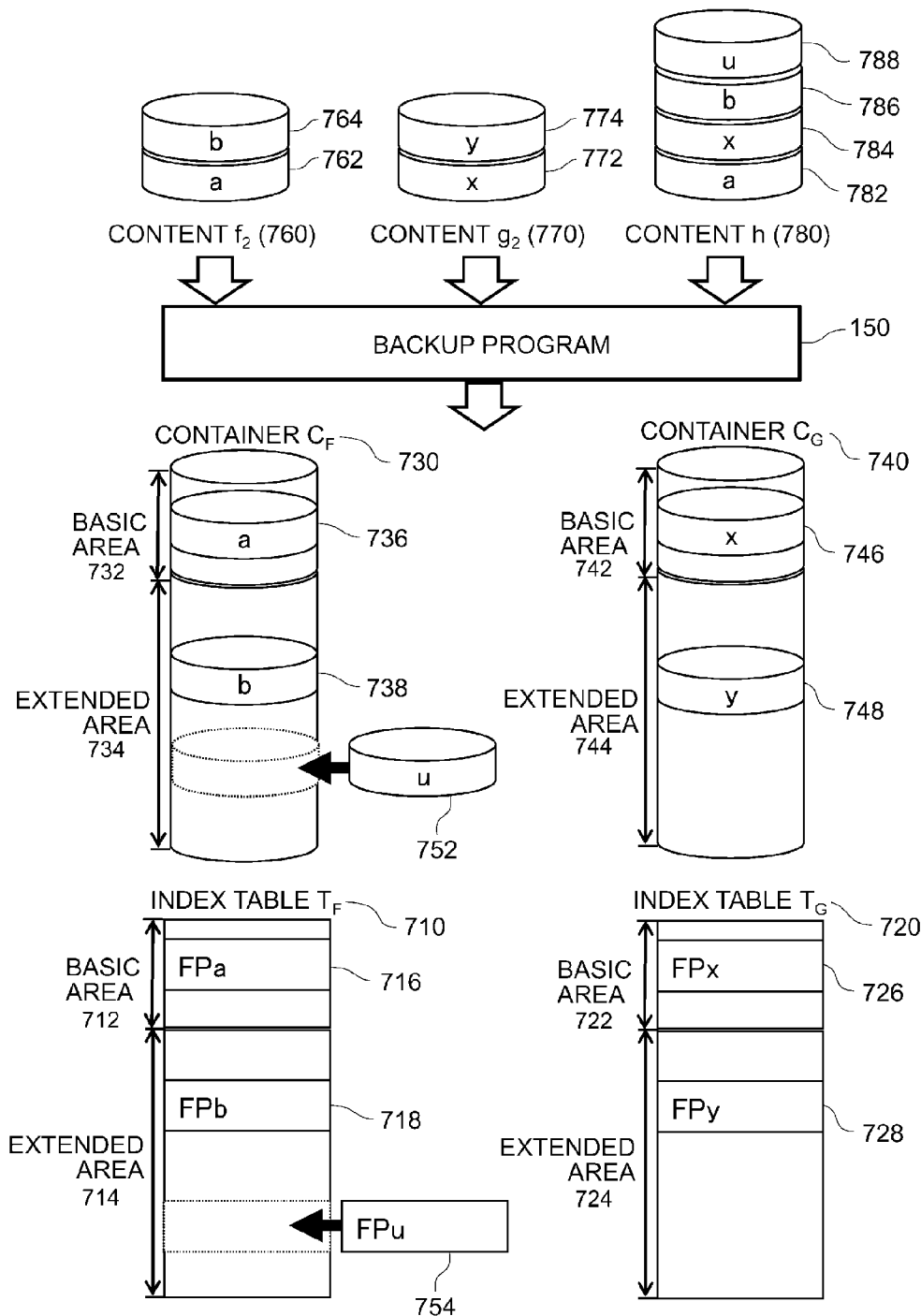
FIG. 9 is a conceptual diagram explaining backup processing according to a second embodiment of the present invention.

For example, it is assumed as shown in FIG. 9 that backup target content has arrived in the order of content f1 (not shown) including chunk a, content g1 (not shown) including chunk x, content f2 (760), content g2 (770), and content h (780). Firstly, a processing sequence for backing up the content from the content f1 to the content g2 will be explained.

Assuming that the chunk a of the content f1 is stored in a basic area 732 of the container CF and the chunk x of the content g1 is stored in a basic area 742 of the container CG, the content f2 (760) includes chunk a (762) and chunk b (764) and the chunk a (762) is a duplicate of the chunk a of the content f1, so that only the chunk b (764) is stored in an extended area 734 of the container CF. Furthermore, the content g2 (770) includes chunk x (772) and chunk y (774) and the chunk x (772) is a duplicate of the chunk x of the content g1, so that only the chunk y (774) is stored in an extended area 744 of the container CG.

Furthermore, a case where content h (780) including chunk a (782), chunk x (784), chunk b (786), and chunk u (788) has arrived as backup target content will be explained. Since the chunk a (782) and the chunk b (786) are duplicates of the chunk a and the chunk b stored in the container CF, they will not be backed up. Also, since the chunk x (784) is a duplicate of the chunk x stored in the container CG, it will not be backed up. Since the chunk u (788) is not a duplicate of any chunk stored in the container CF or the container CG, it is necessary to back up the chunk u (788).

However, according to the first embodiment, if there are two or more containers for which the reference bit (r bit) in the measurement table 160 is 1, the container as the additional write location cannot be selected and a new container is created (see the container selection processing in FIG. 7). So, this embodiment is designed as described above so that if a duplicate chunk(s) included in the content is stored in a plurality of containers, the number of duplicate chunks as measured for each container (counter D) is compared and a container with a large number of duplicate chunks is selected as the additional content write location.

Now, a container selection method using the counter D provided in a measurement table 162 used in this embodiment will be explained. According to this embodiment, the measurement table 162 in which the counter D is provided in addition to the reference bit (r bit) used in the first embodiment is utilized as shown in FIG. 10. This embodiment uses the reference bit (r bit) and the counter D, but may also use the aforementioned update bit (c bit) and valid/invalid bit (v bit) in combination with the reference bit (r bit) and the counter D.

FIG. 10 shows the measurement table 162 in a case where the chunk a (782), chunk x (784), and chunk b (786) included in the content h have arrived.

Firstly, when the chunk a (782) of the content h arrives, the chunk a (782) is a duplicate of the chunk a of the container CF, so that TF for identifying a container index table corresponding to the container CF is stored in a tag 810. Then, the reference bit (r bit) corresponding to the container index table TF is set to 1 (duplication exists) and 1 is added to the counter D.

Next, when the chunk x (784) of the content h arrives, the chunk x (784) is a duplicate of the chunk x of the container CG, so that TG for identifying a container index table corresponding to the container CG is stored in the tag 810. Then, the reference bit (r bit) corresponding to the container index table TG is set to 1 (duplication exists) and 1 is added to the counter D.

Subsequently, when the chunk b (786) of the content h arrives, the chunk b (786) is a duplicate of the chunk b of the container CF, so that the reference bit (r bit) is set to 1 (duplication exists) and 1 is added to the counter D. Actually, the reference bit corresponding to the container index table TF became 1 when the chunk a (782) arrived, so that no change is made. Also, the counter D was set to 1 when the chunk a (782) arrived, so that a value (2) obtained by further adding 1 to the counter D is set.

The chunk u (788) of the content h which arrives later is not a duplicate of either any chunk of the container CF or any chunk of the container CG, so neither the reference bit (r bit) nor the counter D will be updated. Specifically speaking, the reference bit (r bit) is set to both the container CF and the container CG, indicating that duplication exists; and the counter D of the container CF is set to 2 and the counter D of the container CG is set to 1. In this case, a container with a larger number of the counter D is selected as a storage location of the chunk u. As a result, when backing up the content h, the chunks of the content h can be aggregated and stored by selecting the container CF with a larger number of duplicate chunks.

(2-3) Backup Processing

Next, the backup processing executed by the backup program 150 according to this embodiment will be explained. In the following explanation, processing different from the backup processing according to the first embodiment will be explained particularly in detail and the detailed explanation of the same processing has been omitted. In this embodiment, particularly, the container selection processing in step S108 in FIG. 5 is extremely different from the container selection processing according to the first embodiment. The container selection processing will be explained below in detail.

Figure 11:
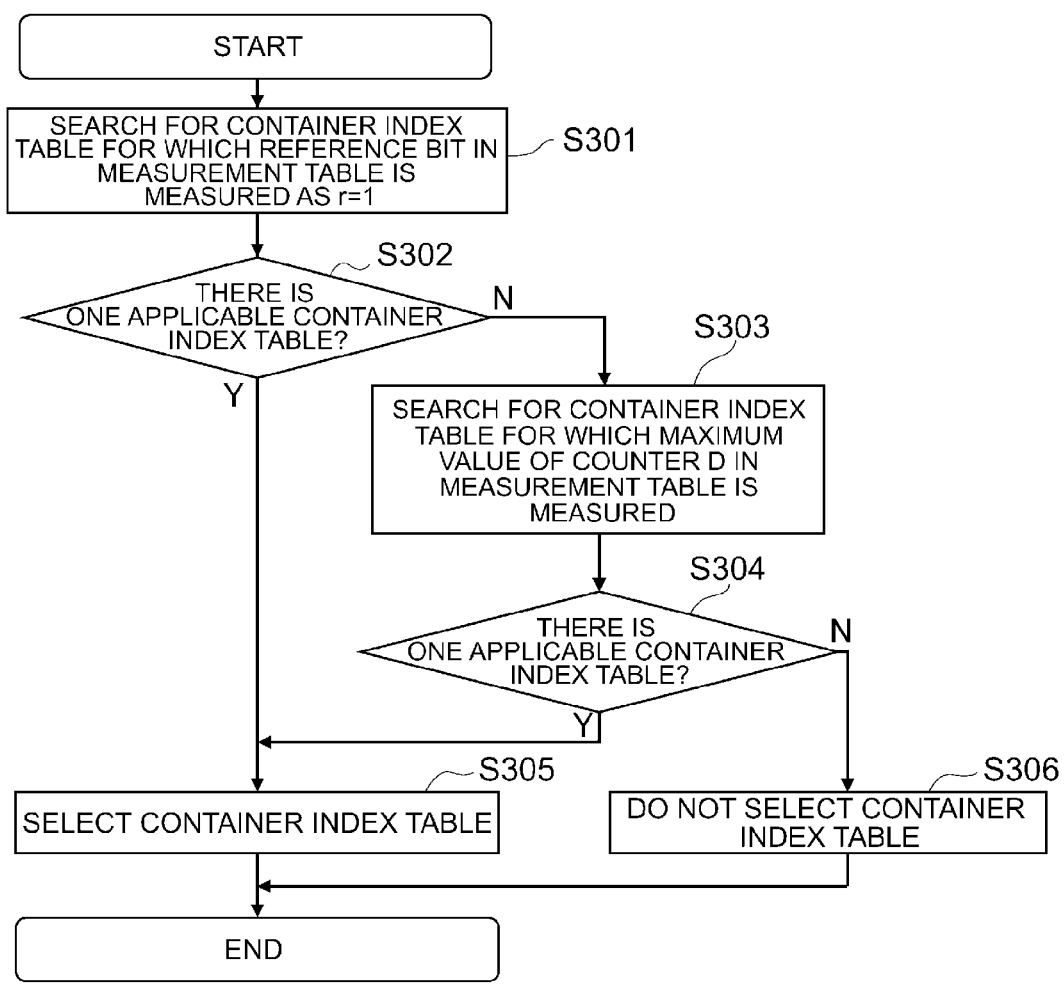
FIG. 11 is a flowchart illustrating a processing sequence for container selection processing according to the second embodiment.

As shown in FIG. 11, the backup program 150 searches for the container index table 110 for which the reference bit (r bit) in the measurement table 162 is 1 (S301). Subsequently, the backup program 150 judges whether or not there is one container index table 110 obtained as a result of the search in step S301 (S302).

If it is determined in step S302 that there is one applicable container index table 110, the backup program 150 selects that container index table 110 (S305) and terminates the processing.

On the other hand, if it is determined in step S302 that the number of applicable container index table 110 is not one, the backup program 150 searches for the container index table 110 for which a maximum value of the counter D in the measurement table 162 is measured (S303). The counter D of the measurement table 162 indicates a total number of duplicate chunks in the container as described above. Therefore, it is possible to search for the container index table 110, for which the maximum value of the counter D is measured, in step S303 and identify the container index table 110 corresponding to the container with a large number of duplicate chunks.

Subsequently, the backup program 150 judges whether or not there is one container index table 110 obtained as a result of the search in step S303 (S304). If it is determined in step S304 that there is one applicable container index table 110, the backup program 150 selects that container index table 110 (S305) and terminates the processing. On the other hand, if it is determined in step S304 that the number of applicable container index table 110 is not one, the backup program 150 does not select the container index table 110 (S306) and terminates the processing.

When there is one container storing a duplicate chunk(s) during the container selection processing in FIG. 11, the processing for selecting the container index table 112 corresponding to the container storing the same chunk as the duplicate chunk is the same as the processing in the first embodiment. However, when there are two or more containers storing a duplicate chunk(s), the container index table 112 corresponding to a container storing a larger number of duplicate chunks is selected. As a result, when there are two or more containers storing a duplicate chunk(s), the container index table 112 corresponding to a container storing a larger number of duplicate chunks can be selected. For example, referring to FIG. 9, the container index table TF (710) and the container index table TG (720) correspond to the container CF (730) and the container CG (740), respectively; and, in this example, the container index table TF (710) is selected.

Furthermore, in this embodiment, when there are two or more containers for which the number of duplicate chunks (counter D) is a maximum value, the backup program 150 checks if the container 130 is full or not, and then stores the chunk in the basic area of the container 130 or creates a new container 130 and stores the chunk in that container 130 in the same manner as the normal chunk write processing.

(2-4) Advantageous Effect of this Embodiment

If a duplicate chunk(s) included in the content is stored in a plurality of containers, the measured number of duplicate chunks is compared with respect to each container and a container with a large number of duplicate chunks is selected as an additional content write location according to this embodiment as described above. As a result, it is possible to aggregate and store a larger number of chunks in one container with regard to a plurality of chunks constituting the content, thereby enabling enhancement of the backup performance and the restoration performance of the storage apparatus 100.

(3) Third Embodiment (3-1) Outline of this Embodiment

Firstly, the outline of this embodiment will be explained. The second embodiment is configured so that when there are two or more containers, for which the number of duplicate chunks (counter D) is a maximum value, during the container selection processing shown in FIG. 11, the additional write location of the backup target content cannot be selected and it is necessary to create a new container. However, according to this embodiment, a container can be selected as the additional write location of the backup target content even when there are two or more containers, for which the number of duplicate chunks is a maximum value.

When the backup target content arrives, the backup program 150 measures the number of duplicate chunks in each container according to this embodiment in the same manner as in the second embodiment. If a duplicate chunk(s) included in the content is stored in a plurality of containers, the backup program 150 compares the measured number of duplicate chunks in each container and selects a container with a large number of duplicate chunks as an additional content write location. Furthermore, in this embodiment, if there are two or more containers with a large number of duplicate chunks (containers for which the maximum value of the counter D is measured), a container to be rolled out by the aforementioned LRU method is selected as the additional content write location.

(3-2) Configuration of Storage Apparatus

Since the configuration of the storage apparatus 100 according to this embodiment is almost the same as that in the first and second embodiments, its detailed explanation has been omitted.

Figure 12:
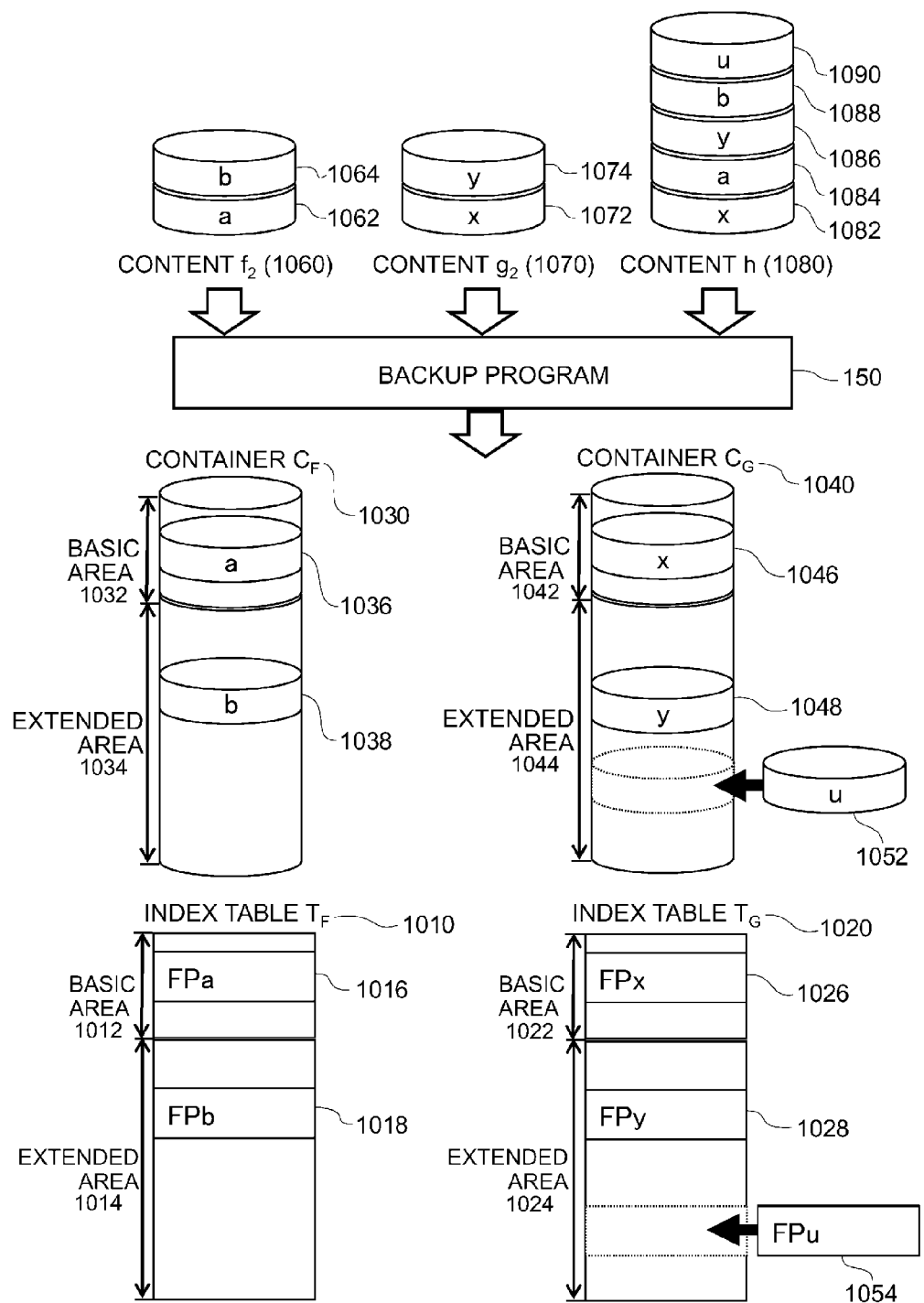
FIG. 12 is a conceptual diagram explaining backup processing according to a third embodiment of the present invention.

For example, it is assumed as shown in FIG. 12 that backup target content has arrived in the order of content f1 (not shown) including chunk a, content g1 (not shown) including chunk x, content f2 (1060), content g2 (1070), and content h (1080). Firstly, a processing sequence for backing up the content from the content f1 to the content g2 will be explained.

Assuming that the chunk a of the content f1 is stored in the basic area 1032 of the container CF and the chunk x of the content g1 is stored in the basic area 1042 of the container CG, the content f2 (1060) includes chunk a (1062) and chunk b (1064) and the chunk a (1062) is a duplicate of the chunk a of the content f1, so that only the chunk b (1064) is stored in the extended area 1034 of the container CF. Furthermore, the content g2 (1070) includes chunk x (1072) and chunk y (1074) and the chunk x (1072) is a duplicate of the chunk x of the content g1, so that only the chunk y (1074) is stored in the extended area 1044 of the container CG.

Furthermore, a case where content h (1080) including chunk x (1082), chunk a (1084), chunk y (1086), chunk b (1088), and chunk u (1090) has arrived as backup target content will be explained. Since the chunk a (1084) and the chunk b (1088) are duplicates of the chunk a and the chunk b stored in the container CF, they will not be backed up. Also, since the chunk x (1082) and the chunk y (1086) are duplicates of the chunk x and the chunk y stored in the container CG, they will not be backed up. Since the chunk u (1090) is not a duplicate of any chunk stored in the container CF or the container CG, it is necessary to back up the chunk u (1090).

However, in the second embodiment, when there are two or more containers, for which the maximum value of the counter D in the measurement table 162 is measured, a container as the additional write location cannot be selected and a new container is created (see the container selection processing in FIG. 11). So, in this embodiment, when there are two or more containers with a large number of duplicate chunks included in the content (containers for which the maximum value of the counter D is measured), a container to be rolled out by the aforementioned LRU method is selected as the additional content write location. Which container should be rolled out can be determined according to the order in which the chunks of the content arrive.

Now, the container selection method using the measurement table 164 employed in this embodiment will be explained. As shown in FIG. 13, the measurement table 164 in which the reference bit (r bit) and the counter D are provided are used in this embodiment in the same manner as in the second embodiment. Furthermore, in this embodiment, 8-bit reference bits (r bits) (r1 bit to r8 bit) are provided and a container to be rolled out is selected according to the 8-bit reference bits. Specifically speaking, a container regarding which values of the 8-bit reference bits (r bits) indicate a small value can be determined by the aging method, one of methods for implementing the LRU method, to be a container to which reference was made most frequently in the past, and which should be rolled out first.

For example, FIG. 13 shows the measurement table 164 when the chunk x (1082), the chunk a (1084), and the chunk b (1088) included in the content h have arrived.

Firstly, when the chunk x (1082) of the content h arrives, the chunk x (1082) is a duplicate of the chunk x of the container CG, so that TG for identifying a container index table corresponding to the container CG is stored in a tag 1110. Then, the reference bit, r1 bit, corresponding to the container index table TG is set to 1 (duplication exists) and 1 is added to the counter D.

Next, when the chunk a (1084) of the content h arrives, the reference bit of the container index table TG which was set when the chunk x (1082) arrived is shifted to the right. Since the chunk a (1084) is a duplicate of the chunk a of the container CF, TF for identifying a container index table corresponding to the container CF is stored in the tag 1110. Then, the reference bit, r1 bit, corresponding to the container index table TF is set to 1 (duplication exists) and 1 is added to the counter D.

Subsequently, when the chunk y (1086) of the content h arrives, the reference bit of the container index table TG, which was set when the chunk x (1082) arrived earlier, and the reference bit of the container index table TF, which was set when the chunk a (1084) arrived earlier, are shifted to the right. Since the chunk y (1086) is a duplicate of the chunk y of the container CG, the reference bit, r1 bit, is set to 1 (duplication exists) and 2 is set to the counter D by adding 1.

Subsequently, when the chunk b (1088) of the content h arrives, the reference bits of the container index table TF and the container index table TG are shifted to the right. Since the chunk b (1088) is a duplicate of the chunk b of the container CF, the reference bit, r1 bit, is set to 1 (duplication exists) and 2 is set to the counter D by adding 1.

Then, when the chunk u (1090) arrives, the reference bits of the container index table TF and the container index table TG are shifted to the right. Since the chunk u (1090) is not a duplicate of any chunk in the container CF or any chunk in the container CG, neither the reference bit, r1 bit, nor the counter D will be updated. Since both the counter D of the container CF and the counter D of the container CG are set to 2, a container for storing the chunk u cannot be selected based on the number of the counter D.

So, in this embodiment, the container index table 110 corresponding to a container to which reference was made most frequently in the past can be selected by selecting the container index table 110 for which a minimum value of the 8-bit reference bits (r bits) is measured. Selecting the container index table 110 to which reference was made most frequently in the past means selecting the container index table 110 to be rolled out first. As a result, efficient backup processing can be executed by additionally writing nonduplicate data of the backup target content to the container index table 110 to be rolled out and reducing wasteful roll-in/roll-out.

(3-3) Backup Processing

Next, the backup processing executed by the backup program 150 according to this embodiment will be explained. In the following explanation, processing different from the backup processing according to the first and second embodiments will be explained particularly in detail and the detailed explanation of the same processing has been omitted. In this embodiment, particularly, the container selection processing in step S108 in FIG. 5 is extremely different from the container selection processing according to the first embodiment. The container selection processing will be explained below in detail.

Figure 14:
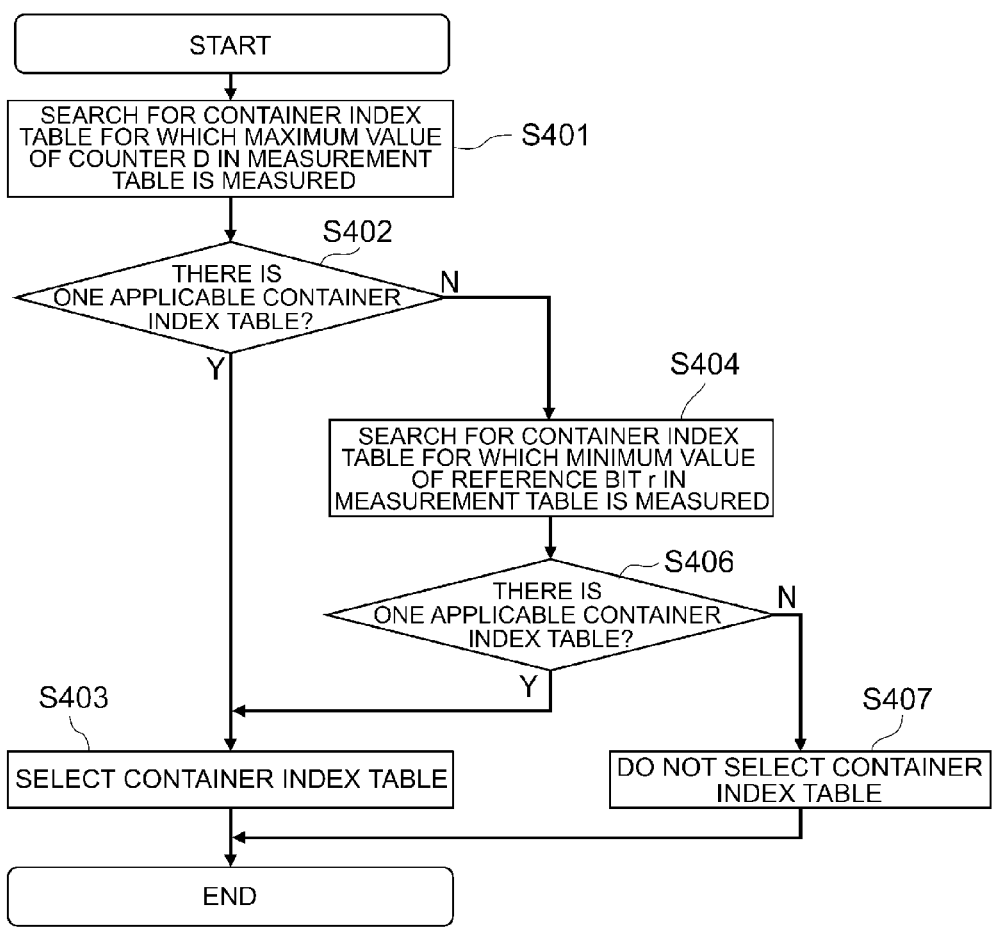
FIG. 14 is a flowchart illustrating a processing sequence for container selection processing according to the third embodiment.

As shown in FIG. 14, the backup program 150 searches for the container index table 110 for which a maximum value of the counter D in the measurement table 164 is measured (S401). Subsequently, the backup program 150 judges whether or not there is one container index table 110 obtained as a result of the search in step S401 (S402).

If it is determined in step S402 that there is one applicable container index table 110, the backup program 150 selects that container index table 110 (S403) and terminates the processing.

On the other hand, if it is determined in step S402 that the number of applicable container index table 110 is not one, the backup program 150 searches for the container index table 110 for which a maximum value of the reference bit (r bit) in the measurement table 164 is measured (S404). In this embodiment, the reference bit (r bit) manages the order in which the chunks arrive as described above. Therefore, the container index table 110 to be rolled out first can be identified by selecting the container index table 110 corresponding to a container to which the chunk that has arrived early referred.

Subsequently, the backup program 150 judges whether or not there is one container index table 110 obtained as a result of the search in step S404 (S406). If it is determined in step S406 that there is one applicable container index table 110, the backup program 150 selects that container index table 110 (S403) and terminates the processing. On the other hand, if it is determined in step S404 that the number of applicable container index table 110 is not one, the backup program 150 does not select the container index table 110 (S407) and terminates the processing.

When there are two or more containers storing duplicate chunks during the container selection processing in FIG. 14, the processing for selecting the container index table 110 corresponding to a container storing a large number of duplicate chunks is the same as the processing in the second embodiment. However, when there are two or more containers for which the maximum value of the number of duplicate chunks is measured, the container index table 110 corresponding to the container 130 storing the content can be selected according to the order in which the chunks arrive, that is, according to the reference time of the container index table 110.

Incidentally, in a case of the configuration where the reference bit (r bit) is shifted to the right after two chunks arrive, two or more container index tables with the minimum value of the reference bit (r bit) may exist, so that the container index table 110 cannot sometimes be selected. In this case, the backup program 150 checks if the container 130 is full or not, and then stores the chunk in the basic area of the container 130 or creates a new container 130 and stores the chunk in that container 130 in the same manner as the normal chunk write processing.

(3-4) Advantageous Effect of this Embodiment

If a duplicate chunk(s) included in the content is stored in a plurality of containers, the measured number of duplicate chunks is compared with respect to each container and a container with a large number of duplicate chunks is selected as an additional content write location according to this embodiment as described above. Furthermore, if there are two or more containers with a large number of duplicate chunks, a container(s) to be rolled out by the aforementioned LRU method is selected as the additional content write location. As a result, it is possible to aggregate and store a larger number of chunks in one container with regard to a plurality of chunks constituting the content, thereby enabling enhancement of the backup performance and the restoration performance of the storage apparatus 100.

(4) Fourth Embodiment (4-1) Outline of this Embodiment

Firstly, the outline of this embodiment will be explained. The difference between this embodiment and the first embodiment is that counter D for measuring the number of duplicate chunks for each container is provided instead of the three kinds of bits, that is, the reference bit (r bit), the update bit (c bit) and the valid/invalid bit (the v bit), in the measurement table 160 shown in FIG. 6 according to this embodiment. The counter D is a counter for measuring the number of duplicate chunks for each container when chunks included in the backup target content arrive sequentially. Specifically speaking, when the backup target content has arrived, the backup program 150 measures the number of duplicate chunks for each container. If a duplicate chunk(s) included in the content is stored in a plurality of containers, the backup program 150 compares the measured number of duplicate chunks in each container and selects a container with a large number of duplicate chunks as an additional content write location. As a result, if there are two or more selected containers in step S108 shown in FIG. 6 (selection of container as the additional write location), in which container the content should be additionally written can be determined (4-2) Configuration of Storage Apparatus Since the configuration of the storage apparatus 100 according to this embodiment is almost the same as that in the first embodiment, its detailed explanation has been omitted.

Figure 15:
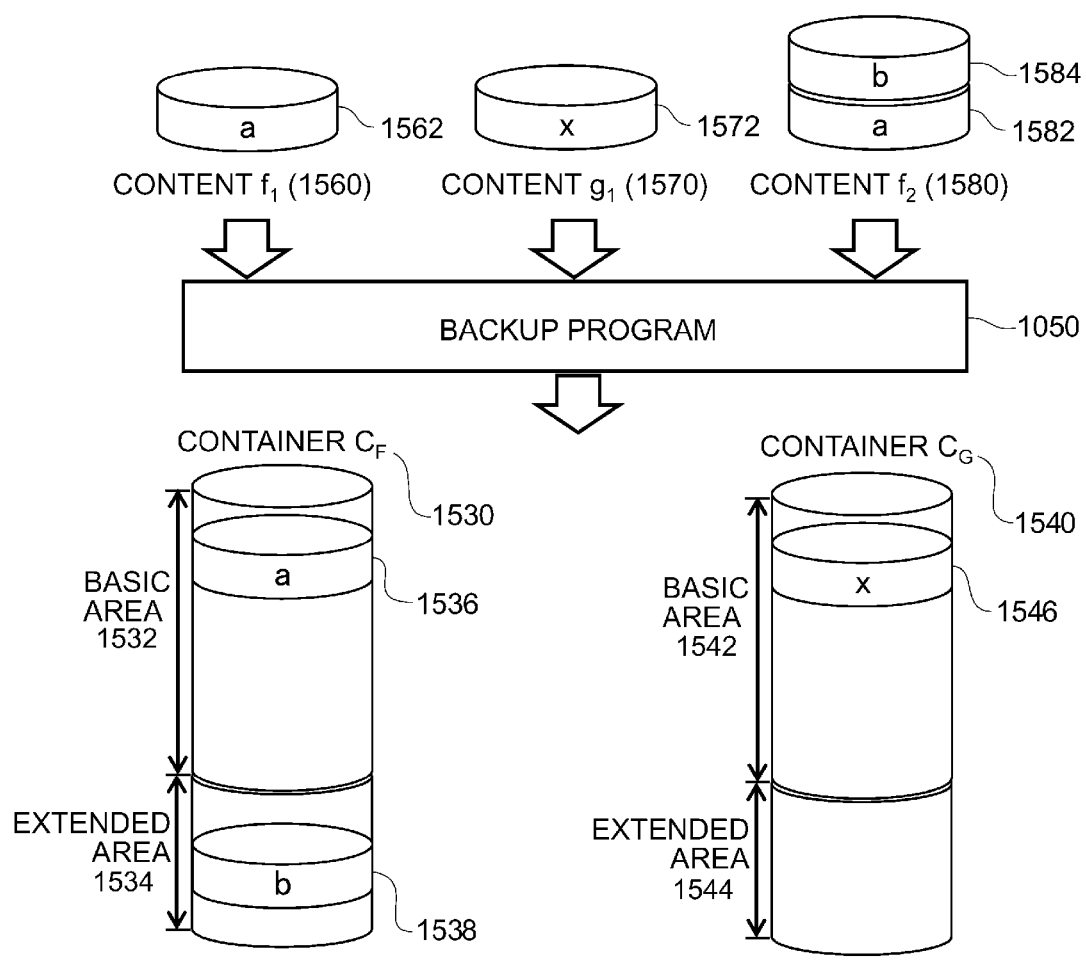
FIG. 15 is a conceptual diagram explaining backup processing according to the third embodiment of the present invention.

For example, when the content arrives in the order of content f1, content g1, and content f2 as shown in FIG. 15, chunk a (1562) of the content f1 is stored in a basic area (1532) of container CF and chunk x (1572) of the content g1 is stored in a basic area (1542) of container CG. If an interval between the arrival of the content f1 and the arrival of the content g1 is short, the chunk x may possibly be stored in the basic area of the container CF. However, for ease of explanation, the following explanation will be given, assuming that the chunk x is stored in the container CG which is different from the container CF where the chunk a is stored.

If chunk a (1582) of the content f2 arrives after the arrival of chunks of the content f1 and the content g1, the chunk a (1582) is a duplicate chunk, so that it will not be stored in the containers. Then, 1 is added to the counter D (container CF) because the content f1 includes the chunk which is a duplicate of the chunk of the container CF. The counter D (container CF) herein used means the number of chunks which are duplicates of chunks stored in the container CF.

Subsequently, when chunk b (1584) of the content f2 arrives, the chunk b (1584) is not a duplicate chunk, so that it is necessary to store the chunk b (1584) in a container. When this happens, a container to store the chunk b is selected by referring to the counter D. Specifically speaking, when the container CF and the container CG exist, the counter D of the container CF is 1 and the counter D of the container CG is 0, so that the container CF is selected as the container to store the chunk b as a result of measurement of the maximum value of the counter D.

When chunk a (1560) of the content f1 arrives as shown in the measurement table 160 in FIG. 16, the chunk a (1560) is not a duplicate chunk, so that the counter D of the content CF is set to 0. Then, when chunk x (1572) of the content g1 arrives, the chunk x (1572) is not a duplicate chunk, so that the counter D of the content CG is set to 0. As a matter of course, the counter D of the content CF remains to be 0. Subsequently, when chunk a (1580) of the content f2 arrives, the chunk a (1580) is a duplicate of the chunk a (1562) of the content f1, so that it will not be stored in the container CF, but the counter D of the container CF is set to 1. Furthermore, when the chunk b (1584) of the content f2 arrives, the chunk b (1584) is not a duplicate chunk, so that both the counter D of the container CF and the counter D of the container CG are set to 0. Then, the backup program 150 selects the container CF, for which the maximum value of the counter D is measured, and stores the chunk in the container CF.

(4-2) Details of Backup Processing

Figure 17:
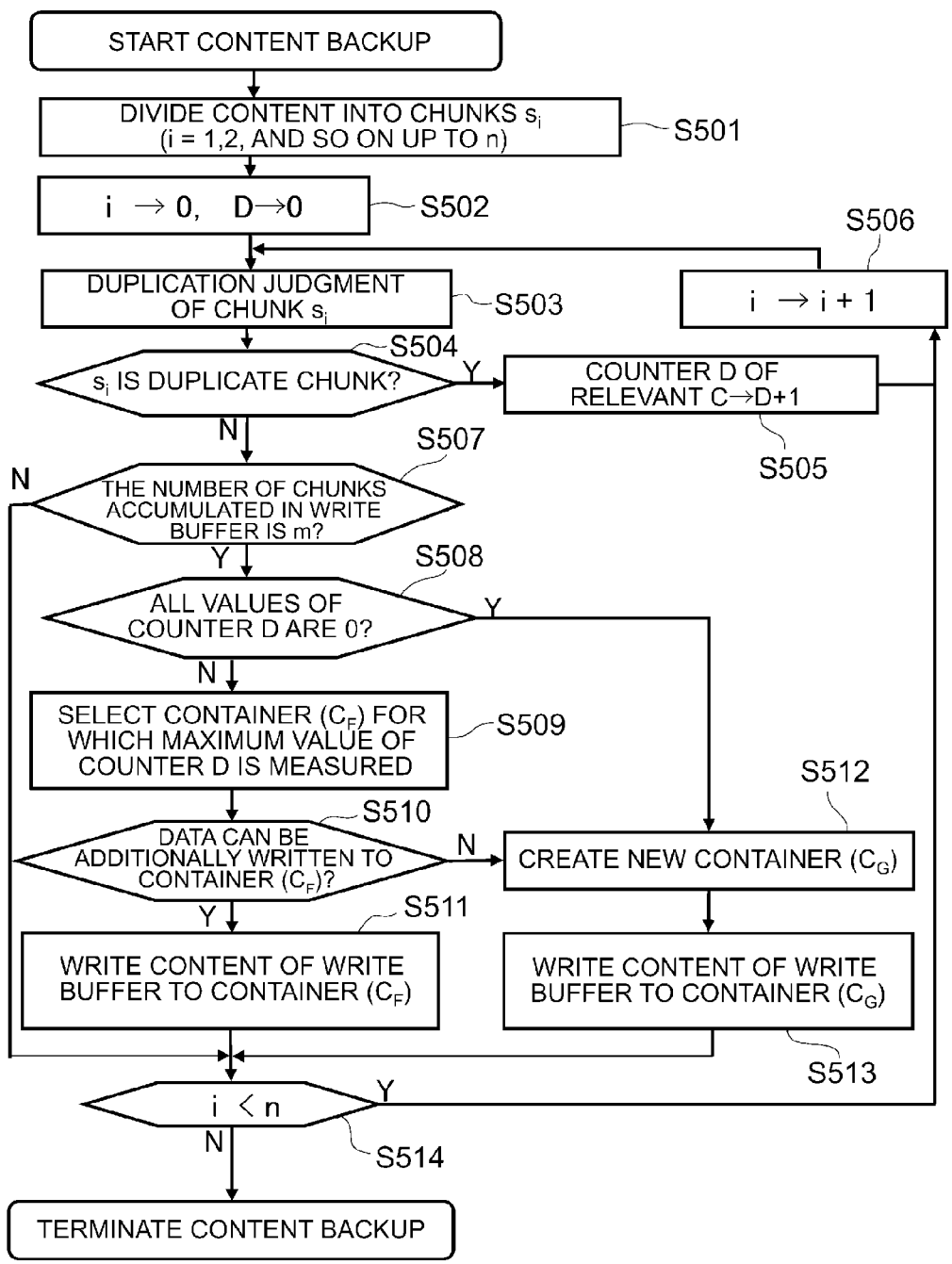
FIG. 17 is a flowchart illustrating a processing sequence for container selection processing according to the third embodiment.

The details of backup processing according to this embodiment will be explained with reference to FIG. 17. As shown in FIG. 17, the backup program 150 decomposes the content, which is a backup target, into chunks Si (i=1, 2, n) (S501).

Then, the backup program initializes the counter i used for loop processing and the aforementioned counter D (i=0, D=0) (S502) and executes the duplication judgment on the chunk Si (S503). Since the duplication judgment processing in step S503 is the same as the duplication judgment processing in step S104 in FIG. 5, its detained explanation has been omitted.

If it is determined as a result of the duplication judgment processing in S503 that the chunk Si is a duplicate chunk (S504), the backup program 150 adds 1 to the counter D of the container, which stores a chunk identical to the duplicate chunk (S505), adds 1 to the counter i, and repeats the duplication judgment processing in step S503 on the next chunk. On the other hand, if it is determined that the chunk Si is not a duplicate chunk (S504), the backup program 150 executes processing in step S507.

If it is determined in step S504 that the chunk Si is not a duplicate chunk, the backup program 150 judges whether or not m pieces of chunks have accumulated in the write buffer (S507). The backup program 150 repeats the chunk duplication judgment processing in step S504 until m pieces (for example, m=10) of chunks accumulate in the write buffer. Alternatively, the backup program 150 may repeats the chunk duplication judgment processing in step S504 on all the chunks included in the content.

If it is determined in step S507 that m pieces of chunks have accumulated in the write buffer, the backup program 150 judges whether all values of the counter D are 0 or not (S508). The case where it is determined in step S508 that all values of the counter D are 0 is a case where there is no duplicate chunk in m pieces of chunks If it is determined in step S508 that all values of the counter D are 0, the backup program 150 creates a new container (CG) (S512) and writes the chunks in the write buffer to the container (CG) (S513). For example, when the content f1 shown in FIG. 9 arrives or when the content g1 arrives, the processing in step S512 and step S513 is executed.

On the other hand, if it is determined in step S508 that all values of the counter D are not 0, the backup program 150 selects the container (CF) for which the maximum value of the counter D is measured (S509). Then, the backup program 150 judges whether data can be additionally written to the container (CF) selected in step S509 (S510). If data can be additionally written to the container (CF), the backup program 150 writes the chunks in the write buffer to the container (CF) (S511). If it is determined in step S510 that a new chunk cannot be additionally written to the container (CF) selected in step S509, the backup program 150 creates a new container (CG) (S512). For example, when the content f2 shown in FIG. 9 arrives, the processing from step S509 to step S511 is executed.

Then, the backup program 150 judges whether or not the duplication judgment processing and the write processing have terminated with respect to all the chunks (S514). If it is determined that the duplication judgment processing and the write processing have terminated with respect to all the chunks, the backup program 150 terminates the content backup processing. On the other hand, if it is determined in step S514 that the duplication judgment processing and the write processing have not terminated with respect to all the chunks, the backup program 150 adds 1 to the counter i (S506) and repeats the processing in step S503 and subsequent steps.

(4-3) Advantageous Effect of this Embodiment

If a duplicate chunk(s) included in the content is stored in a plurality of containers, the measured number of duplicate chunks is compared with respect to each container and a container with a large number of duplicate chunks is selected as an additional content write location according to this embodiment as described above. As a result, it is possible to aggregate and store a larger number of chunks in one container with regard to a plurality of chunks constituting the content, thereby enabling enhancement of the backup performance and the restoration performance of the storage apparatus 100.

(5) Other Embodiments

The aforementioned embodiments have described the case where the processor 102 is used as a control unit for controlling the entire processing relating to various functions according to such embodiments; however, the present invention is not limited to those embodiments, and hardware and/or software for executing the processing as such control unit may be provided separately from the processor 102. Even if such hardware and/or software are provided, the same advantageous effects as those of the aforementioned embodiments can be obtained.

Furthermore, for example, the respective steps of the processing by the storage apparatus 100 or other devices in this specification do not necessarily have to be processed chronologically in the order described in the relevant flowchart. In other words, the respective steps in the processing by the storage apparatus 100 or other devices may be executed in parallel even if they are different processing.

Furthermore, hardware such as a CPU, ROM, and RAM contained in, for example, the storage apparatus 100 may be created as a computer program for fulfilling functions equal to those of each component of the aforementioned storage apparatus 100 and other devices. Furthermore, storage media in which such a computer program is stored is provided.

Industrial Applicability

The present invention can be applied to a wide variety of storage apparatuses for deduplicating chunks of the content and storing the chunks in containers.

Reference Signs List

100 Storage apparatus
  102 Processor
  104 Memory
  106 Disk
  108 Network interface
  110 Container index table
  150 Backup program
  152 Restoration program
  160, 162, 164 Measurement tables

The invention claimed is:

1. A storage apparatus connected via a network to a host system issuing a content write request, the storage apparatus comprising:
    a storage unit providing one or more containers composed of a specified storage area; and
    a back up unit storing the content in the container in accordance with a backup request from the host system;
    wherein the backup unit cuts out the content into one or more chunks, detects a duplicate chunk, which is a duplicate of a chunk stored in the container, from the cutout chunks, and additionally writes the chunk, other than the duplicate chunk, to the container where the duplicate chunk is stored;

wherein if the content includes a plurality of duplicate chunks and the plurality of duplicate chunks are stored in two or more containers, the backup unit stores the chunk other than the duplicate chunk in the container which stores a large number of duplicate chunks.

2. The storage apparatus according to claim 1, wherein the storage area of the container is constituted from a basic area and an extended area;

the duplicate chunk is stored in the basic area; and
the chunk other than the duplicate chunk is stored in the extended area.

3. The storage apparatus according to claim 2, wherein the storage unit stores a container index table corresponding to the basic area and the extended area of the container;

the container index table stores management information of the chunk stored in the container; and
the backup unit detects the duplicate chunk based on the management information of the chunk stored in the container index table.

4. The storage apparatus according to claim 3, wherein when storing the chunk in the container, the backup unit stores the management information of the chunk in the container index table corresponding to the container.

5. The storage apparatus according to claim 3, wherein the container index table stores chunk identification information for identifying the chunk, positional information of the chunk in the container, and management information including a chunk length of the chunk.

6. The storage apparatus according to claim 5, wherein the chunk identification information for identifying the chunk is a message digest of the chunk.

7. The storage apparatus according to claim 1, wherein if the content includes the plurality of duplicate chunks and the plurality of duplicate chunks are stored in the two or more containers, the backup unit detects reference timing of the duplicate chunk stored in the container with respect to each container and stores the chunk other than the duplicate chunk in the container regarding which the reference timing is early.

8. The storage apparatus according to claim 7, wherein the backup unit manages reference timing of the container index table to which reference is made when detecting the duplicate chunk; and if the content includes the plurality of duplicate chunks and the plurality of duplicate chunks are stored in the two or more containers, the backup unit detects the reference timing of the container index table corresponding to the container with respect to each container index table and selects the container index table regarding which the reference timing is early.

9. The storage apparatus according to claim 3, wherein the backup unit: manages a reference bit for referring to the container and the container index table and an update bit for updating the container and the container index table with respect to each chunk included in the content;

sets a flag of the reference bit if the chunk is the duplicate chunk; and
sets a flag of the update bit if the chunk is not the duplicate chunk.

10. An additional data writing method using a storage apparatus connected via a network to a host system issuing a content write request, the storage apparatus including a storage unit providing one or more containers composed of a specified storage area, and a back up unit storing the content in the container in accordance with a backup request from the host system, the additional data writing method comprising:
a step executed by the backup unit cutting out the content into one or more chunks;
a step executed by the backup unit detecting a duplicate chunk, which is a duplicate of a chunk stored in the container, from the cutout chunks; and
a step executed by the backup unit additionally writing the chunk, other than the duplicate chunk, to the container where the duplicate chunk is stored; and
a step executed, if the content includes a plurality of duplicate chunks and the plurality of duplicate chunks are stored in two or more containers, by the backup unit storing the chunk other than the duplicate chunk in the container which stores a large number of duplicate chunks.

11. The additional data writing method according to claim 10, wherein the storage area of the container is constituted from a basic area and an extended area;

the duplicate chunk is stored in the basic area; and
the chunk other than the duplicate chunk is stored in the extended area.

12. The additional data writing method according to claim 11, wherein the storage unit stores a container index table corresponding to the basic area and the extended area of the container; and the container index table stores management information of the chunk stored in the container; and
wherein the additional data writing method further comprises a fourth step executed by the backup unit, in the detecting a duplicate chunk step, detecting the duplicate chunk based on the management information of the chunk stored in the container index table.

13. The additional data writing method according to claim 12, further comprising a step executed, when storing the chunk in the container, by the backup unit storing the management information of the chunk in the container index table corresponding to the container.

14. The additional data writing method according to claim 12, wherein the container index table stores chunk identification information for identifying the chunk, positional information of the chunk in the container, and management information including a chunk length of the chunk.

15. The additional data writing method according to claim 14, wherein the chunk identification information for identifying the chunk is a message digest of the chunk.

16. The additional data writing method according to claim 10, further comprising a step executed, if the content includes the plurality of duplicate chunks and the plurality of duplicate chunks are stored in the two or more containers, by the backup unit detecting reference timing of the duplicate chunk stored in the container with respect to each container and storing the chunk other than the duplicate chunk in the container regarding which the reference timing is early.

17. The additional data writing method according to claim 16, further comprising a step executed by the backup unit: managing reference timing of the container index table to which reference is made when detecting the duplicate chunk; and detecting the reference timing of the container index table corresponding to the container with respect to each container index table and selecting the container index table regarding which the reference timing is early if the content includes the plurality of duplicate chunks and the plurality of duplicate chunks are stored in the two or more containers.

18. The additional data writing method according to claim 12, further comprising a step executed by the backup unit: managing a reference bit for referring to the container and the container index table and an update bit for updating the container and the container index table with respect to each chunk included in the content;
- setting a flag of the reference bit if the chunk is the duplicate chunk; and
- setting a flag of the update bit if the chunk is not the duplicate chunk.

* * * * *